United States Patent
Tomlinson et al.

(10) Patent No.: US 12,088,497 B2
(45) Date of Patent: Sep. 10, 2024

(54) TECHNIQUES TO BALANCE LOG STRUCTURED MERGE TREES

(71) Applicant: Micron Technology, Inc., Boise, ID (US)

(72) Inventors: Alexander Tomlinson, Austin, TX (US); Gaurav Sanjay Ramdasi, Austin, TX (US); Greg Alan Becker, Austin, TX (US); Nabeel Meeramohideen Mohamed, Round Rock, TX (US); Steven Andrew Moyer, Round Rock, TX (US); Tristan Antonio Partin, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 17/886,865

(22) Filed: Aug. 12, 2022

(65) Prior Publication Data

US 2024/0056387 A1 Feb. 15, 2024

(51) Int. Cl.
*H04L 45/48* (2022.01)
*G06F 16/22* (2019.01)

(52) U.S. Cl.
CPC .......... *H04L 45/48* (2013.01); *G06F 16/2246* (2019.01)

(58) Field of Classification Search
CPC ............................. H04L 45/48; G06F 16/2246
See application file for complete search history.

(56) References Cited

U.S. PATENT DOCUMENTS

| | | | |
|---|---|---|---|
| 8,996,563 B2 * | 3/2015 | Bender | G06F 16/217 |
| | | | 707/769 |
| 10,757,016 B2 * | 8/2020 | De Graaff | H04L 47/78 |
| 10,761,948 B1 * | 9/2020 | Zhuo | H04L 9/3239 |
| 11,204,905 B2 * | 12/2021 | Lambov | G06F 16/2246 |
| 11,550,479 B1 * | 1/2023 | Shatsky | G06F 3/0613 |
| 2019/0065508 A1 * | 2/2019 | Guturi | G06F 16/13 |
| 2019/0073378 A1 * | 3/2019 | Guturi | G06F 16/13 |
| 2019/0116117 A1 * | 4/2019 | De Graaff | H04L 45/484 |
| 2020/0004851 A1 * | 1/2020 | Lambov | G06F 16/2255 |
| 2020/0084153 A1 * | 3/2020 | Ma | H04L 43/16 |
| 2021/0094179 A1 * | 4/2021 | You | B25J 9/1666 |
| 2021/0103478 A1 * | 4/2021 | Kyaw | G06F 9/5066 |
| 2022/0222154 A1 * | 7/2022 | Pogde | G06F 16/128 |
| 2022/0414102 A1 * | 12/2022 | Shatsky | G06F 16/24552 |
| 2023/0177033 A1 * | 6/2023 | Bruso | G06F 16/2379 |
| | | | 707/797 |

* cited by examiner

*Primary Examiner* — Huawen A Peng
(74) *Attorney, Agent, or Firm* — Holland & Hart LLP

(57) ABSTRACT

Methods, systems, and devices for techniques to balance log structured merge trees are described. A computing system may rebalance a tree structure having an ordered set of leaf nodes by splitting or joining leaf nodes of the tree structure. To split a leaf node, the computing system may select a key to evenly partition key and value data stored in the leaf. The computing system may place each key block of the leaf node having keys less than or equal to the selected key in a first new leaf node, and may place each key block of the leaf node having keys greater than the selected key in a second new leaf node. To join leaf nodes of the tree structure, the computing system may place each key block and each value block of the leaf node and the adjacent leaf node in a new leaf node.

26 Claims, 13 Drawing Sheets

```
┌─────────────────────────────────────────────┐
│ Determine whether a size of a first leaf node and a size of
│ a second leaf node of an ordered set of leaf nodes of a
│ data structure satisfies a threshold, the first leaf node
│ adjacent to the second leaf node, wherein the data
│ structure comprises: a first level having a root node
│ comprising a first set of key blocks; a second level having
│ the set of leaf nodes each comprising a respective set of     ⟍ 705
│ key blocks, each key block of the root node and the set of
│ leaf nodes comprising a plurality of keys; and a set of
│ edges, each edge between the root node and a respective
│                    leaf node
└─────────────────────────────────────────────┘
                          │
                          ▼
┌─────────────────────────────────────────────┐
│   Generate a third leaf node based at least in part on
│ determining that the size of the first leaf node and the
│ second leaf node satisfies the threshold, wherein the third   ⟍ 710
│ leaf node comprises a set of key blocks of the first leaf
│   node and a set of key blocks of the second leaf node
└─────────────────────────────────────────────┘
```

TECHNIQUES TO BALANCE LOG STRUCTURED MERGE TREES

FIELD OF TECHNOLOGY

The following relates to one or more systems for memory and storage, including techniques to balance log structured merge trees.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 6 and 7 show flowcharts illustrating a method or methods that support techniques to balance log structured merge trees in accordance with examples as disclosed herein.

DETAILED DESCRIPTION

Figure 1:
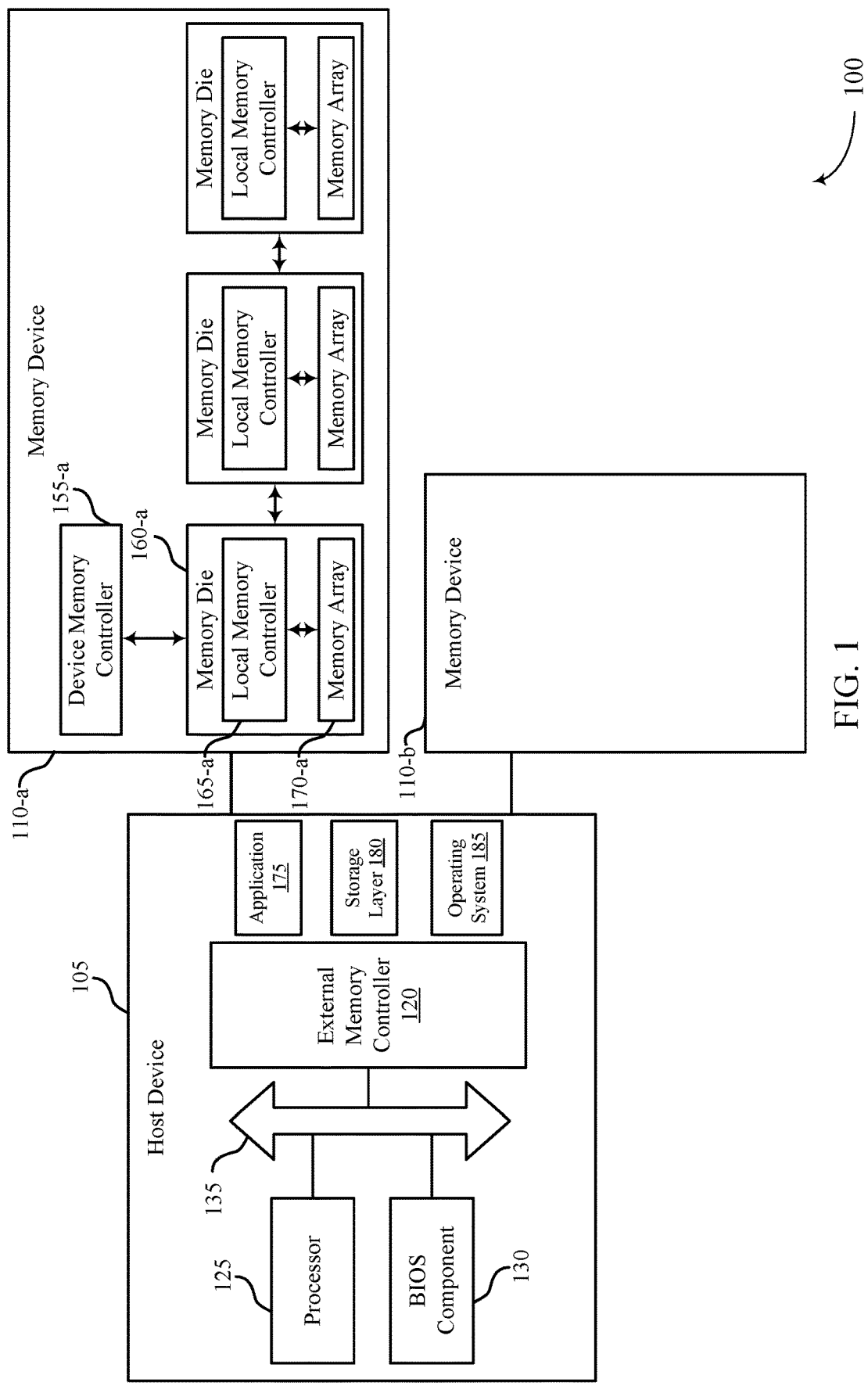
FIG. 1 illustrates an example of a system that supports techniques to balance log structured merge trees in accordance with examples as disclosed herein.

Some computing systems may make use of databases stored across multiple types of memory devices (e.g., random access memory (RAM) devices, magnetic hard disks, FeRAM devices, flash memory, PCM devices, self-selecting memory, chalcogenide memory technologies, solid state drives (SSDs)). A database may store data in the form of files containing media blocks, which may include a set of keys and a corresponding set of values. In some cases, the media blocks may be organized in a tree structure, such as a log-structured merge (LSM) tree. In some cases, adding media blocks to the tree structure may result in the tree structure becoming unbalanced, which may reduce performance of the tree structure, for example by increasing search complexity for keys and values in the tree structure. Some computing systems may not be configured to rebalance the tree structure, or may use significant system resources, such as a large quantity of read and write operations to a non-volatile memory device storing the tree structure. Accordingly, efficient techniques to rebalance a tree structure stored on a non-volatile memory device are desired.

As described herein, a computing system may rebalance a tree structure having an ordered set of leaf nodes stored on a non-volatile memory device by splitting or joining leaf nodes of the tree structure. For example, if the size of a leaf node satisfies a criteria (e.g., by exceeding a threshold), the computing system may split the leaf node by selecting a key to evenly partition key and value data stored in the leaf. The computing system may place each key block of the leaf node having keys less than the selected key, along with the corresponding value blocks, in a first new leaf node, and may place each key block of the leaf node having keys greater than the selected key, along with the corresponding value blocks, in a second new leaf node. In some cases, if the selected key splits a key block (e.g., if a key block includes keys greater than the selected key and less than the selected key), the computing system may replace the key block by creating a first new key block having keys less than or equal to the selected key and by creating a second new key block having keys greater than the selected key. In some cases, the computing system may also replace a value block corresponding to the split key block by creating a first new value block having values corresponding to the first new key block and by creating a second new value block having values corresponding to the second new key block. The computing system may store the first new key block and the first new value block in first new leaf node, and may store the second new key block and the second new value block in the second new leaf node. The computing system may set the key of an edge of the first new leaf node to the selected key, and may set a key of the edge of the second new leaf node to the key of the original leaf node.

Additionally or alternatively, to join leaf nodes of the tree structure, the computing system may determine whether a sum of sizes of a leaf node and an adjacent leaf node satisfies a threshold. If the sum satisfies a threshold, the computing system may place each key block and each value block of the leaf node and the adjacent leaf node in a new leaf node, and may set a key of an edge of the new leaf node to the greater of the keys of the edges of the leaf node and the adjacent leaf node. Because splitting and joining leaf nodes may use a relatively small quantity of access commands to the non-volatile memory device, techniques to rebalance tree structures as described herein may efficiently utilize access commands to the non-volatile memory device.

Features of the disclosure are initially described in the context of systems and dies as described with reference to FIG. 1. Features of the disclosure are described in the context of systems and process flows as described with reference to FIGS. 2A through 4. These and other features of the disclosure are further illustrated by and described with reference to an apparatus diagram and flowcharts that relate to techniques to balance log structured merge trees as described with reference to FIGS. 5 through 7.

FIG. 1 illustrates an example of a system 100 that supports techniques to balance log structured merge trees in accordance with examples as disclosed herein. The system 100 may include a host device 105, a memory device 110, and a plurality of channels coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110-a may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110-a may be an independent device or a component that is operable to provide physical memory addresses/space that may be used or referenced by the system 100. In some examples, a memory device 110-a may be configurable to work with one or more different types of host devices. Signaling between the host device 105 and the memory device 110-a may be operable to support one or more of: modulation schemes to modulate the signals, various pin configurations for communicating the signals, various form factors for physical packaging of the host device 105 and the memory device 110-a, clock signaling and synchronization between the host device 105 and the memory device 110-a, timing conventions, or other functions.

The memory device 110-a may be operable to store data for the components of the host device 105. In some examples, the memory device 110-a (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110-a may include a device memory controller 155-a and one or more memory dies 160-a (e.g., memory chips) to support a capacity (e.g., a desired capacity, a specified capacity) for data storage. Each memory die 160-a (e.g., memory die 160-a-a, memory die 160-a-b, memory die 160-a-N) may include a local memory controller 165-a (e.g., local memory controller 165-a-a, local memory controller 165-a-b, local memory controller 165-a-N) and a memory array 170-a (e.g., memory array 170-a-a, memory array 170-a-b, memory array 170-a-N). A memory array 170-a may be a collection (e.g., one or more grids, one or more banks, one or more tiles, one or more sections) of memory cells, with each memory cell being operable to store one or more bits of data. A memory device 110-a including two or more memory dies 160-a may be referred to as a multi-die memory or a multi-die package or a multi-chip memory or a multi-chip package. In some cases, the memory die 160 may be non-volatile memory devices such as ferroelectric RAM (FeRAM), magnetic RAM (MRAM), resistive RAM (RRAM), flash memory, phase change memory (PCM), self-selecting memory, chalcogenide memory technologies, not-or (NOR), or not-and (NAND) memory devices.

The device memory controller 155-a may include components (e.g., circuitry, logic) operable to control operation of the memory device 110-a. The device memory controller 155-a may include hardware, firmware, or instructions that enable the memory device 110-a to perform various operations and may be operable to receive, transmit, or execute commands, data, or control information related to the components of the memory device 110-a. The device memory controller 155-a may be operable to communicate with one or more of the external memory controller, the one or more memory dies 160-a, or the processor 125. In some examples, the device memory controller 155-a may control operation of the memory device 110-a described herein in conjunction with the local memory controller 165-a of the memory die 160-a.

A local memory controller 165-a (e.g., local to a memory die 160-a) may include components (e.g., circuitry, logic) operable to control operation of the memory die 160-a. In some examples, a local memory controller 165-a may be operable to communicate (e.g., receive or transmit data or commands or both) with the device memory controller 155-a. In some examples, a memory device 110-a may not include a device memory controller 155-a, and a local memory controller 165-a or the external memory controller 120 may perform various functions described herein. As such, a local memory controller 165-a may be operable to communicate with the device memory controller 155-a, with other local memory controllers 165-a, or directly with the external memory controller 120, or the processor 125, or any combination thereof. Examples of components that may be included in the device memory controller 155-a or the local memory controllers 165-a or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155-a or local memory controller 165-a or both.

The external memory controller may be operable to enable communication of information (e.g., data, commands, or both) between components of the system 100 (e.g., between components of the host device 105, such as the processor 125, and the memory device 110-a). The external memory controller may process (e.g., convert, translate) communications exchanged between the components of the host device 105 and the memory device 110-a. In some examples, the external memory controller, or other component of the system 100 or the host device 105, or its functions described herein, may be implemented by the processor 125. For example, the external memory controller may be hardware, firmware, or software, or some combination thereof implemented by the processor 125 or other component of the system 100 or the host device 105. In some examples, the external memory controller, or its functions described herein, may be implemented by one or more components of a memory device 110-a (e.g., a device memory controller 155-a, a local memory controller 165-a) or vice versa.

In some examples, the host device 105 may execute an application 175, which may make use of a database stored in a memory device 110-a. The application 175 may communicate, via a storage layer 180, with an operating system 185 of the host device 105 to manage mappings between virtual addresses accessible by the application 175 and physical locations of data, such as media blocks, stored in the memory device 110-a. For example, the application 175 may issue a request for virtual addresses corresponding to one or more media blocks to the storage layer 180, and the storage layer 180 may obtain an allocation in a virtual address space of a second memory device 110-b (e.g., a main memory of the host device 105), along with an indication of a virtual address range for the requested media blocks in the virtual address space from the operating system 185. The storage layer 180 may then return an indication of the virtual address ranges for the requested media blocks to the application 175.

In some cases, a host device 105 may rebalance a tree structure having an ordered set of leaf nodes stored on a non-volatile memory device, such as the memory device 110-b, by splitting or joining leaf nodes of the tree structure.

For example, if the size of a leaf node exceeds a threshold, the host device 105 may split the leaf node by selecting a key to evenly (e.g., approximately evenly) partition key and value data stored in the leaf. The host device 105 may place each key block of the leaf node having keys less than the selected key, along with the corresponding value blocks, in a first new leaf node, and may place each key block of the leaf node having keys greater than the selected key, along with the corresponding value blocks, in a second new leaf node. In some cases, if the selected key splits a key block (e.g., if a key block includes keys greater than the selected key and less than the selected key), the host device 105 may replace the key block by creating a first new key block having keys less than or equal to the selected key and by creating a second new key block having keys greater than the selected key. In some cases, the host device 105 may also replace a value block corresponding to the split key block by creating a first new value block having values corresponding to the first new key block and by creating a second new value block having values corresponding to the second new key block. The host device 105 may store the first new key block and the first new value block in first new leaf node, and may store the second new key block and the second new value block in the second new leaf node. The host device 105 may set the key of a edge of the first new leaf node to the selected key, and may set a key of the edge of the second new leaf node to the key of the original leaf node.

Additionally or alternatively, to join leaf nodes of the tree structure, the host device 105 may determine whether a sum of sizes of a leaf node and an adjacent leaf node satisfies a threshold. If the sum satisfies a threshold, the host device 105 may place each key block and each value block of the leaf node and the adjacent leaf node in a new leaf node, and may set a key of an edge of the new leaf node to the greater of the keys of the edges of the leaf node and the adjacent leaf node. Because splitting and joining leaf nodes may use a relatively small quantity of access commands to the memory device 110-b, techniques to rebalance tree structures as described herein may efficiently utilize access commands to the memory device 110-b.

Figure 2A:
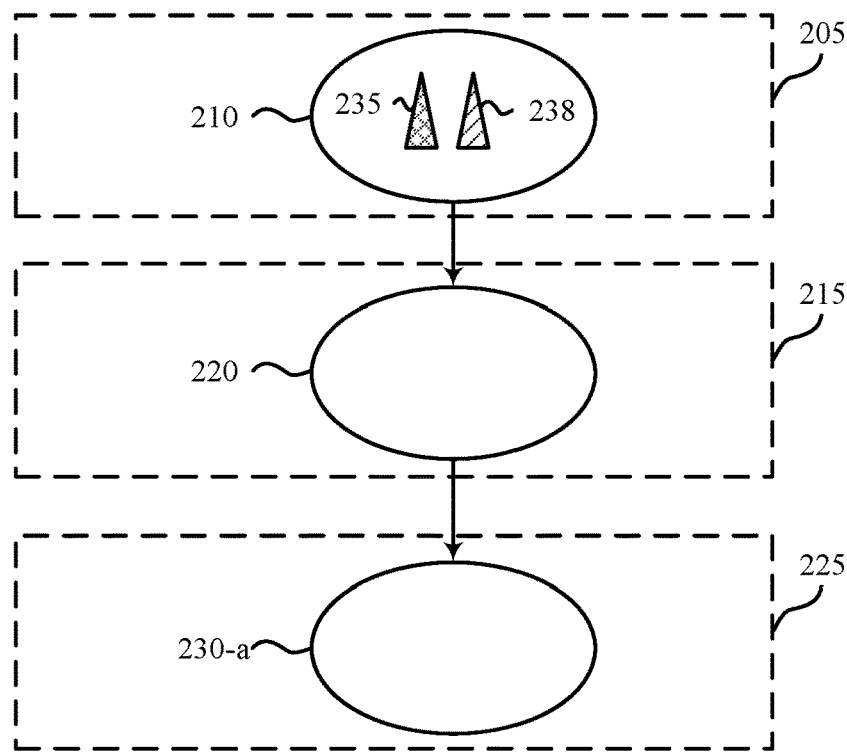
FIGS. 2A through 2L illustrates examples of systems that support techniques to balance log structured merge trees in accordance with examples as disclosed herein.
Figure 2A:
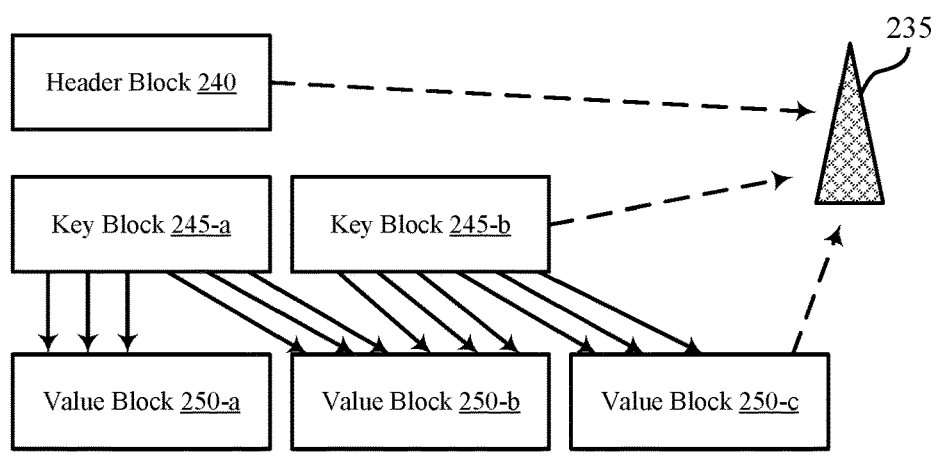

FIGS. 2A through 2L illustrates examples of operations for a data structure that supports techniques to balance log structured merge trees in accordance with examples as disclosed herein. For example, FIGS. 2A through 2L may illustrate aspects of a sequence of operations for adding data to a data structure and removing key-value block sets from the data structure. In some examples, the data structure may be stored across multiple memory devices. For example, FIG. 2A may illustrate a system 200-a which includes aspects of the data structure, including a level 215 (e.g., a first level, level 1) having a root node 220 and a level 225 (e.g., a second level, level 2) having one or more leaf nodes 230. Although the example of FIG. 2A shows a single leaf node 230-a, the level 225 may include multiple leaf nodes. In some cases, the data structure may also include a level 205 (e.g., a third level, level 0). The level 215 and the level 225 may be stored in one or more non-volatile memory devices, such as a NAND device, a solid state drive (SSD), a hard disk drive (HDD), among other examples. Additionally, the level 205 may be stored in a volatile memory device, such as a DRAM device, which may operate as a main memory of a host device using the data structure. In some cases, data may flow from the host device to the level 205 in the volatile memory device to the level 215 and subsequently to the level 225 in the non-volatile memory device (e.g., from level 0 to level 1 to level 2).

The data structure may be used to store keys and values corresponding to the keys in one or more key-value block sets 235. In some cases, a key-value block set 235 may include one or more value blocks 250, such as a value block 250-*a*, a value block 250-*b*, and a value block 250-*c*, which may contain values associated with keys.

The key-value block set 235 may further include one or more key blocks 245, such as a key block 245-*a* and a key block 245-*b*. Key blocks 245 may each include a set of keys, along with an index which may be used to search for keys of the key blocks 245. In some cases, the key blocks 245 may include metadata, such as a mapping or other association, to identify a value associated with a particular key. For example, the key block 245-*a* may include metadata to map a key of the key block 245-*a* with a value of the value block 250-*a*. In some cases, keys of key blocks 245 may correspond to values of separate value blocks. For example, a first key in the key block 245-*b* may correspond to a value in the value block 250-*b*, while a second key in the key block 245-*b* may correspond to a value in the value block 250-*c*.

The set of key blocks 245 contained in a key-value block set 235 may be ordered based on the keys in each of the key blocks 245. For example, the set of key blocks 245 may be ordered such that a largest key of a first key block 245 in the order may be less than a smallest key of a second key block 245 in the order, while a largest key of the second key block 245 be less than a smallest key of a third key block 245 of the order, and so on. In some cases, keys within key blocks 245 may be ordered lexicographically (e.g., may be ordered based on a quantity or string used to represent the keys). In some examples as described herein, an ordered set may refer to a totally ordered set.

In some cases, the key-value block set 235 may contain a header block 240. The header block 240 may include metadata associated with the key-value block set 235, such as an indication of a largest key contained in the key-value block set 235, and indication of the smallest key contained in the key-value block set 235, a size of the key-value block set 235, a quantity of key blocks 245, a quantity of value blocks 250, or any combination thereof.

A header block 240, a key block 245, and a value block 250 may each be an example of a media block of the data structure. In some cases, a media block may be an example of a binary immutable data file. That is, after being created, a media block may not be modified or adjusted, but may be accessed to read data stored in the media block (e.g., a media block may be read-only).

A key-value block set 235 stored in the level 205 of the data structure may be active or inactive. For example, a host device may write media blocks (e.g., key blocks 245, value blocks 250, or both) to an active key-value block set 238 of the level 205. In some cases, an active key-value block set 238 may become inactive (e.g., may be frozen) based on a condition of the active key-value block set 238. For example, the active key-value block set 238 may be inactivated upon receiving a threshold quantity of media blocks or upon reaching a threshold data size, such as one gigabyte of data.

Figure 2B:
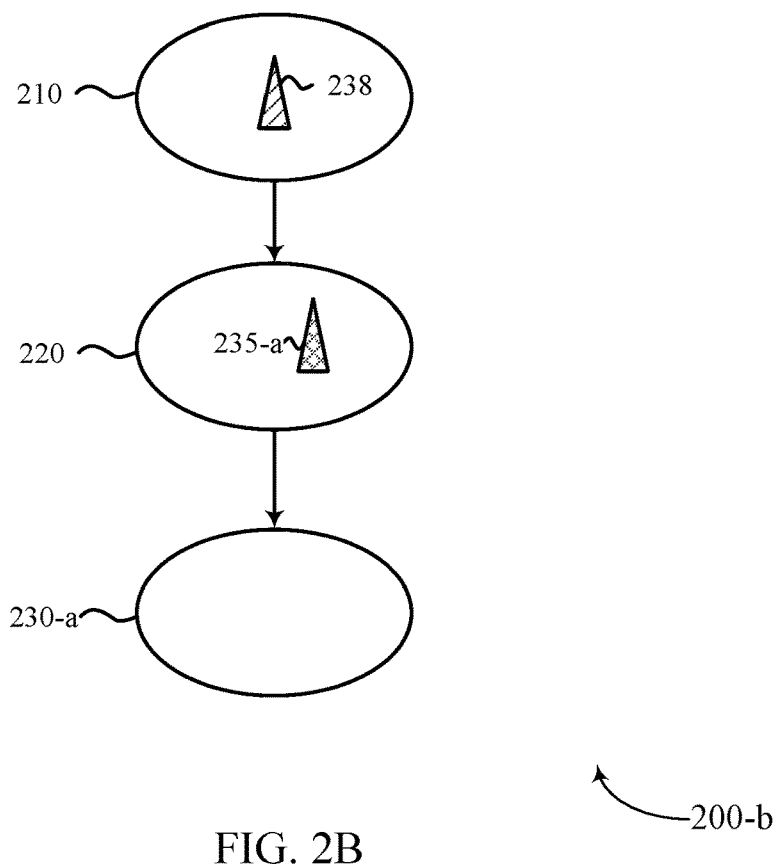

FIG. 2B illustrates an example of a system 200-*b* after an operation that supports techniques to balance log structured merge trees in accordance with examples as disclosed herein. The operation may include transferring the key-value block set 235-*a* from the level 205 of the data structure to the root node 220 of the level 215 of the data structure. In some cases, the key-value block set 235-*a* may be transferred upon becoming inactive, or in response to another condition, such as a command issued by the host device.

Because the level 205 and the root node 220 may be stored on separate memory devices (e.g., on a volatile memory device and a non-volatile memory device, respectively), transferring the key-value block set 235-*a* may include reading the key-value block set 235-*a* from the volatile memory device and storing the key-value block set to the non-volatile memory device. In some cases, a typical size of a key-value block set 235 in the level 205 and in the root node 220 may be similar (e.g., may be around one gigabyte), although other sizes are possible.

Figure 2C:
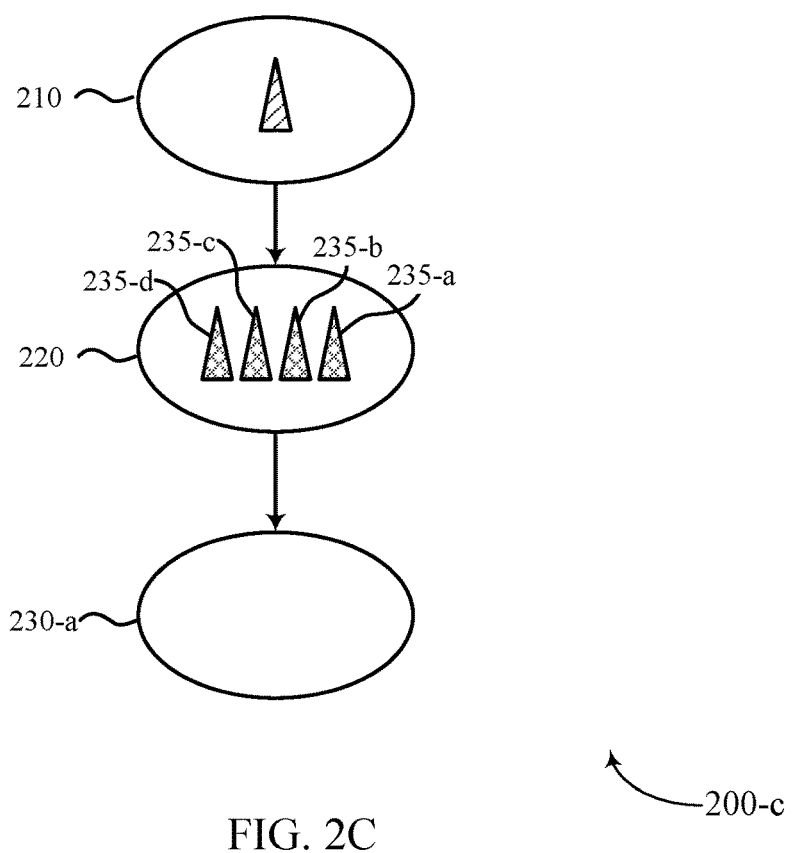

FIG. 2C illustrates an example of a system 200-*c* after an operation that supports techniques to balance log structured merge trees in accordance with examples as disclosed herein. The operation may include transferring one or more additional key-value block sets 235 from the level 205 to the root node 220. For example, after transferring the key-value block set 235-*a* from the level 205 to the root node 220, the operation may include transferring a second key-value block set 235-*b*, followed by a third key-value block set 235-*c*, followed by a fourth key-value block set 235-*d*. In some cases, the set of key-value block sets 235 of the root node 220 may be ordered based on the age or order of transferring the set of key-value block sets 235. For example, the key-value block set 235-*c* may be subsequent to the key-value block set 235-*d*, the key-value block set 235-*b* may be subsequent to the key-value block set 235-*c*, and the key-value block set 235-*a* may be subsequent to the key-value block set 235-*b*.

Figure 2D:
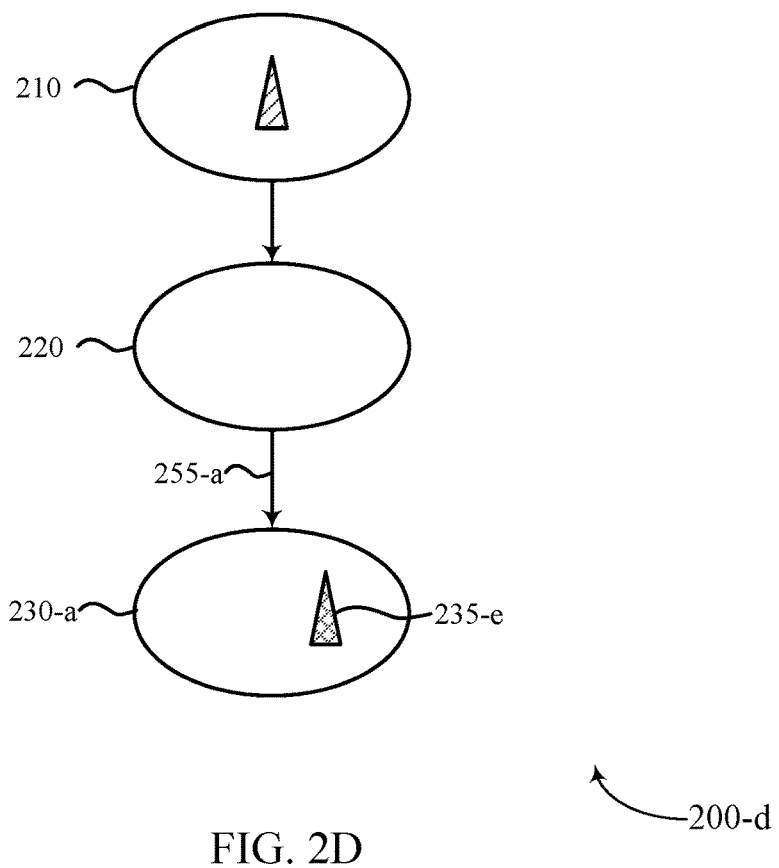

FIG. 2D illustrates an example of a system 200-*d* after an operation that supports techniques to balance log structured merge trees in accordance with examples as disclosed herein. The operation may include transferring key-value block sets 235 from the root node 220 to the leaf node 230-*a*. For example, upon the root node 220 reaching a threshold, such as having a threshold quantity of key-value block sets 235 or storing a threshold quantity of data, the key-value block sets 235 (e.g., the key-value block set 235-*a*, the key-value block set 235-*b*, the key-value block set 235-*c*, and the key-value block set 235-*d*) of the root node 220, the system 200-*d* may merge the key-value block sets 235 into a single larger key-value block set 235-*e*, which may contain the data (e.g., the key blocks 245 and the value blocks 250) of the merged key-value block sets. In some examples, such an operation may be referred to as spilling the root node 220.

In some cases, as part of spilling the root node 220, the system 220-*d* may select a leaf node 230 to transfer the key-value block sets 235 based on a key of an edge 255-*a* of the leaf node 230. For example, the system 200-*d* may select a leaf node 230 having an edge with a key greater than a largest key of the transferred key-value block sets 235. In some cases, if the system 200-*d* includes a single leaf node 230-*a*, the edge 255-*a* corresponding to the leaf node 230-*a* may have a key defined to be greater than any other key (e.g., a key of infinity).

Figure 2E:
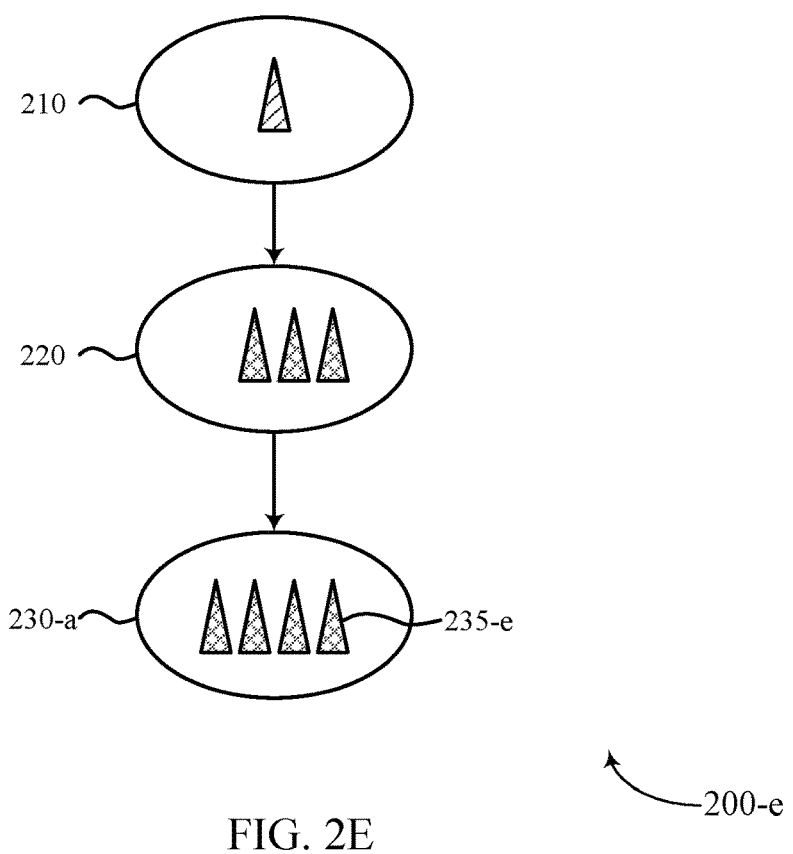

FIG. 2E illustrates an example of a system 200-*e* after an operation that supports techniques to balance log structured merge trees in accordance with examples as disclosed herein. The operation may include adding additional key-value block sets to the root node 220 and spilling additional key-value block sets 235 to the leaf node 230-*a*. In some cases, the set of key-value block sets 235 of the leaf node 230-*a* may be ordered according to the age (e.g., the order of spilling) of the set of key-value block sets 235. In some examples, due to spilling the additional key-value block sets 235 to the leaf node 230-*a*, a size (e.g., a quantity of data) of the leaf node 230-*a* may drop below a threshold, such as a threshold of 16 gigabytes. Accordingly, the system 200-*e* may determine to split the leaf node 230-*a* into additional leaf nodes 230.

Figure 2F:
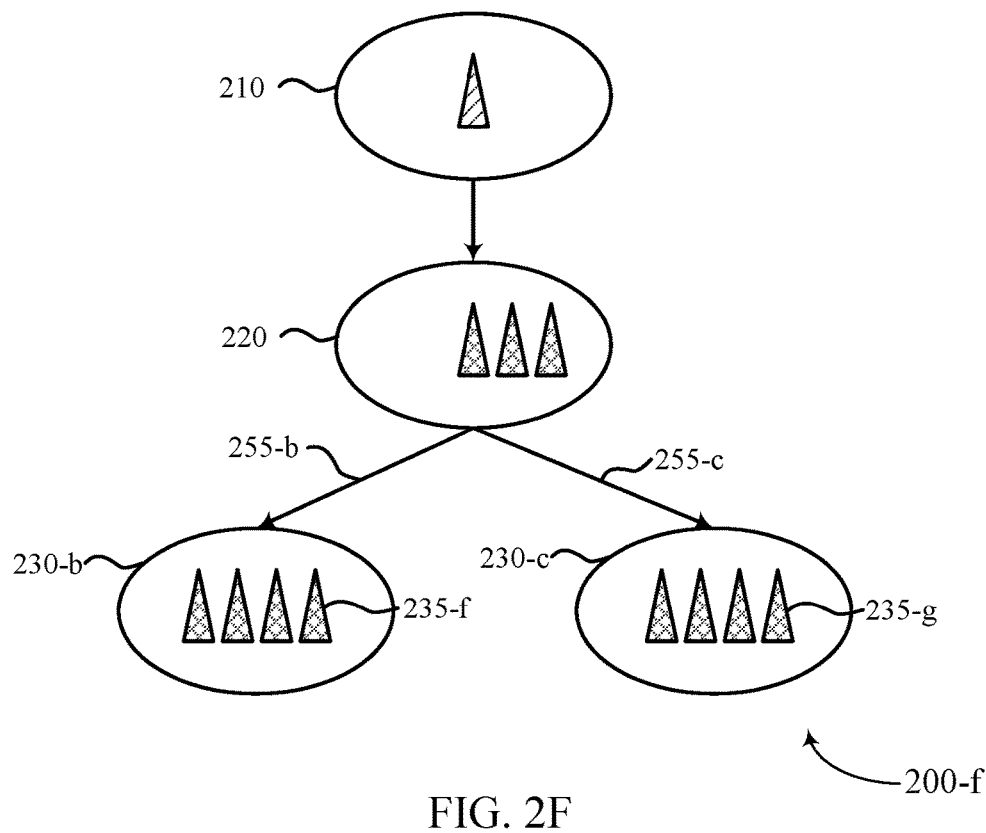

FIG. 2F illustrates an example of a system 200-*f* after an operation that supports techniques to balance log structured merge trees in accordance with examples as disclosed herein. The operation may include splitting the leaf node 230-*a* into the leaf node 230-*b* and the leaf node 230-*c*. In some examples, to split the leaf node 230-*a*, the system 200-*f* may select a key to partition the key-value block sets 235 of the leaf node 230-*a* into two substantially equal sets (two sets having substantially equal sizes). The system 200-*f* may split each key-value block set 235 into a two new key-value block sets 235 using the selected key. For example, to split the key-value block set 235-*e*, the system 200-*f* may associate each key block 245 of the key-value block set 235-*e* having keys less than or equal to the selected key, along with the corresponding value blocks 250, with a key-value block set 235-*f* of the leaf node 230-*b*, and may associate each key block 245 having keys greater than the selected key, along with the corresponding value blocks 250, with a key-value block set 235-*g* of the leaf node 230-*c*. In some cases, the key of the edge 255-*b* of the leaf node 230-*b* may be set to the selected key, while the key of the edge 255-*c* of the leaf node 230-*c* may be set to the key of the edge 255-*a* of the leaf node 230-*a*.

In some examples, if a key block 245 contains keys both greater than the selected key and less than the selected key, the system 200-*f* may split the key block 245, along with the corresponding value block 250, by rewriting the key block 245 to create a first key block 245 having keys less than or equal to the selected key and create a second key block 245 having keys greater than the selected key. In some cases, the system 200-*f* may also replace a value block 250 corresponding to the key block 245 by creating a first value block 250 having values corresponding to the first key block 245 and by creating a second value block 250 having values corresponding to the second key block 245. The system 200-*f* may store the first key block 245 and the first value block 250 in a key-value block set 235 of the leaf node 230-*b*, and may store the second key block 245 and the second value block 250 in a key-value block set 235 of the leaf node 230-*c*.

In some examples, splitting the leaf node 230-*a* may maintain a physical location of at least some of the key-value block sets 235, such as key blocks 245 and value blocks 250 which have not been split. For example, transferring media blocks from the leaf node 230-*a* to the leaf node 230-*b* or the leaf node 230-*c* may be performed by modifying metadata associated with the media blocks, such as by modifying a virtual address for the media blocks or modifying metadata associated with the data structure. Accordingly, at least some media blocks may remain at a same physical address (e.g., a same set of memory cells, a same physical location on the non-volatile memory device) before and after the splitting.

Figure 2G:
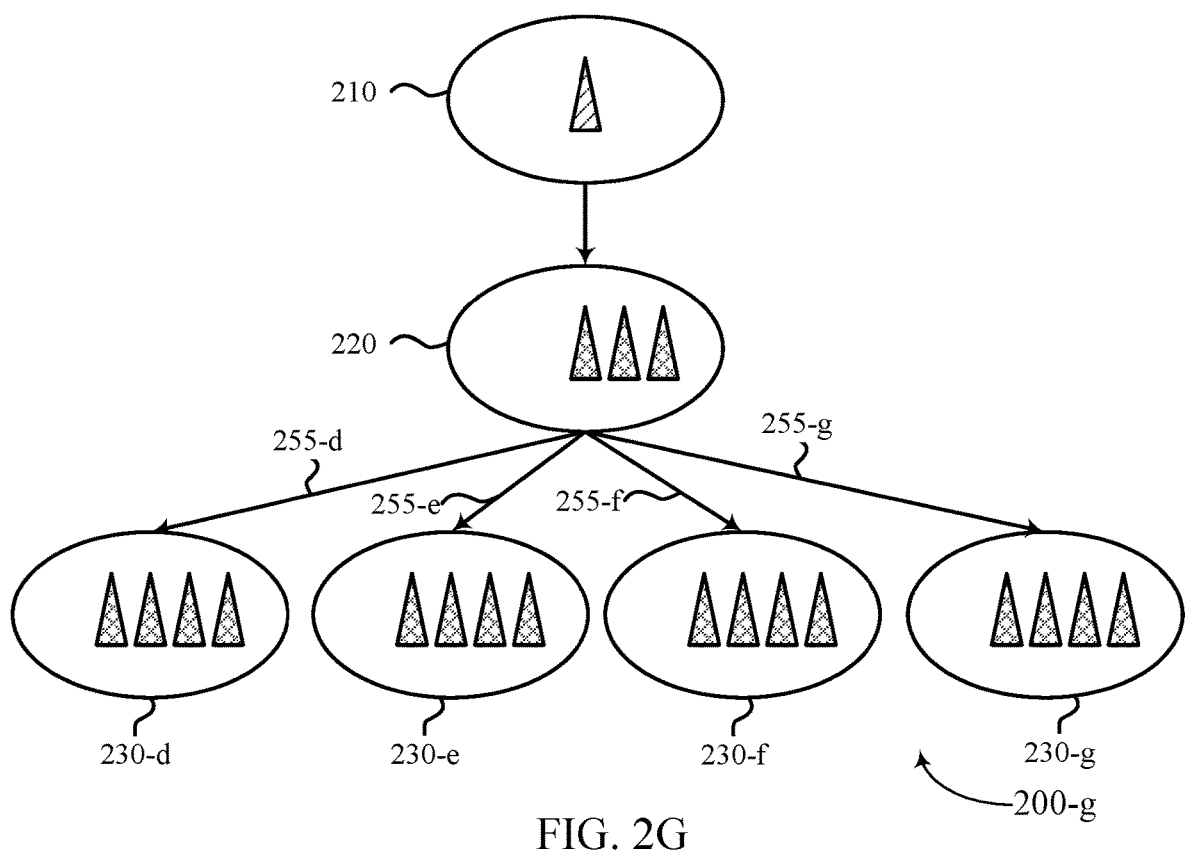

FIG. 2G illustrates an example of a system 200-*g* after an operation that supports techniques to balance log structured merge trees in accordance with examples as disclosed herein. The operation may include adding additional key-value block sets to the root node 220, spilling additional key-value block sets 235 to the level 225, and splitting leaf nodes 230 into the leaf node 230-*d*, the leaf node 230-*e*, the leaf node 230-*f*, and the leaf node 230-*g*. In some cases, the set of leaf nodes 230 of the system 200-*g* may be ordered according to the keys of the edges of the leaf nodes 230. For example, the key of the edge 255-*d* may be less than the key of the edge 255-*e*, the key of the edge 255-*e* may be less than the key of the edge 255-*f*, and the key of the edge 255-*f* may be less than the key of the edge 255-*g*.

Figure 2H:
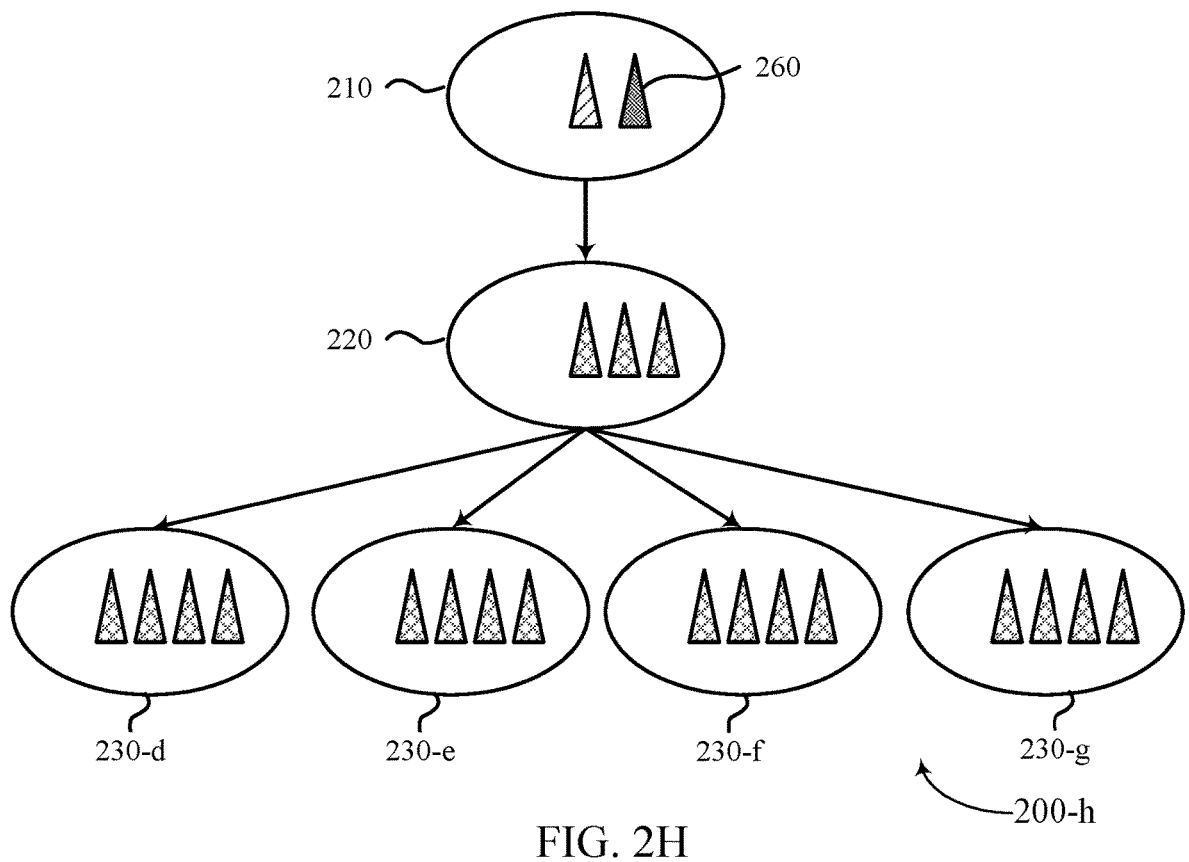

FIG. 2H illustrates an example of a system 200-*h* after an operation that supports techniques to balance log structured merge trees in accordance with examples as disclosed herein. The operation may include storing an indication 260 to delete one or more media blocks, such as one or more key blocks 245 and corresponding value blocks 250, from the data structure. In some examples, the indication 260 may be an example of a key-value block set 235, and accordingly, may include one or more key blocks 245 and one or more value blocks 250. In some cases, a portion of the keys of the indication 260 may correspond to keys already written to the data structure. Additionally, indication 260 may include an indication to delete or remove keys and values corresponding to the portion of the keys.

Figure 2I:
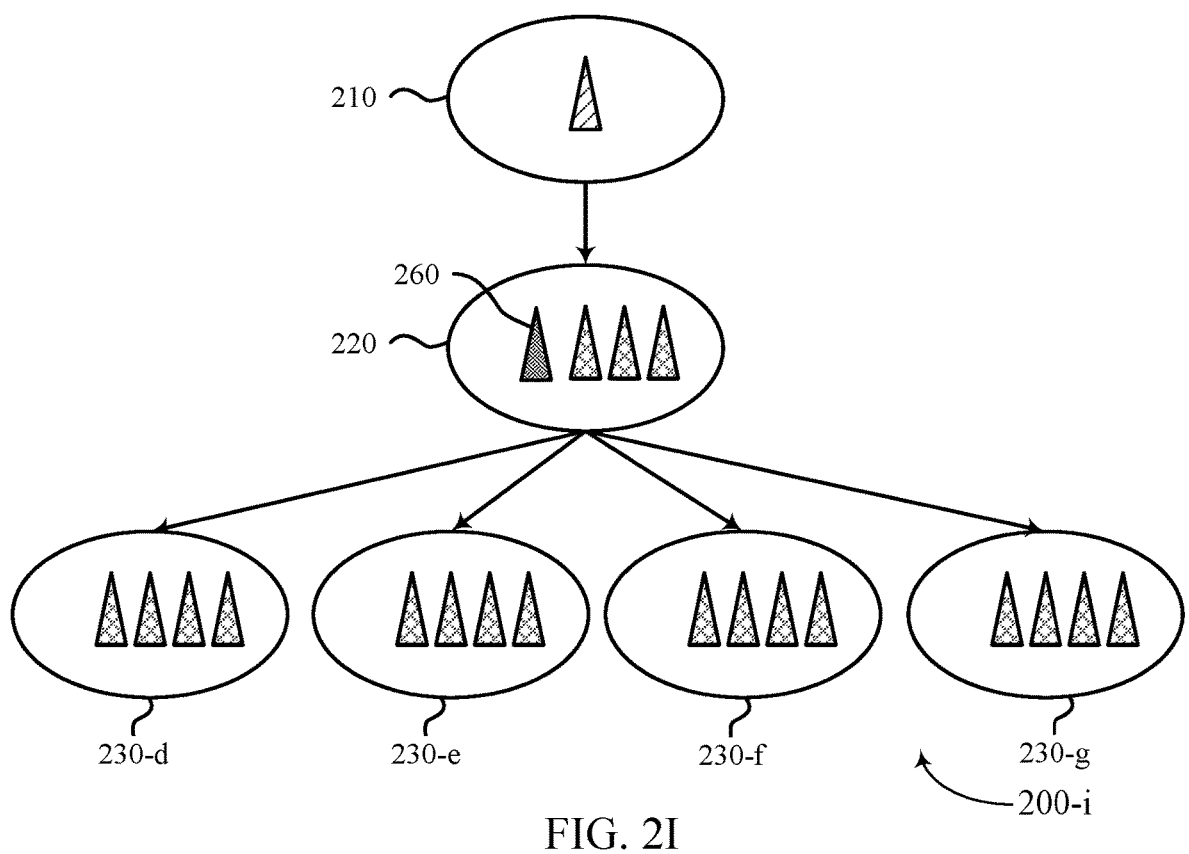
Figure 2J:
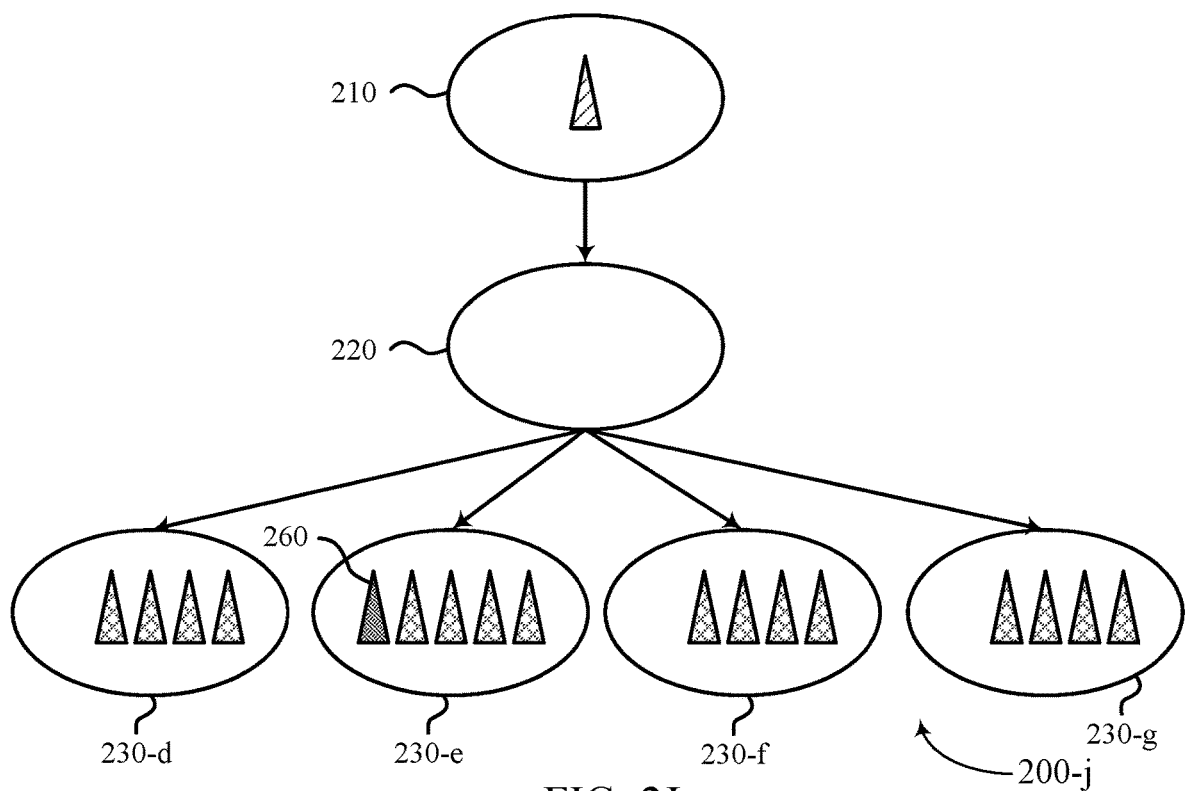

Because the indication 260 may be an example of a key-value block set 235, the system 200-*h* may store the indication 260 in the level 205, and the indication 260 may be transferred to the root node 220, as illustrated by the system 200-*i* of FIG. 2I, and spilled, along with other key-value block sets 235 of the root node 220, to a leaf node 230, such as the leaf node 230-*e*, of the level 225 of the data structure, as illustrated by the system 200-*j* of FIG. 2J.

Figure 2K:
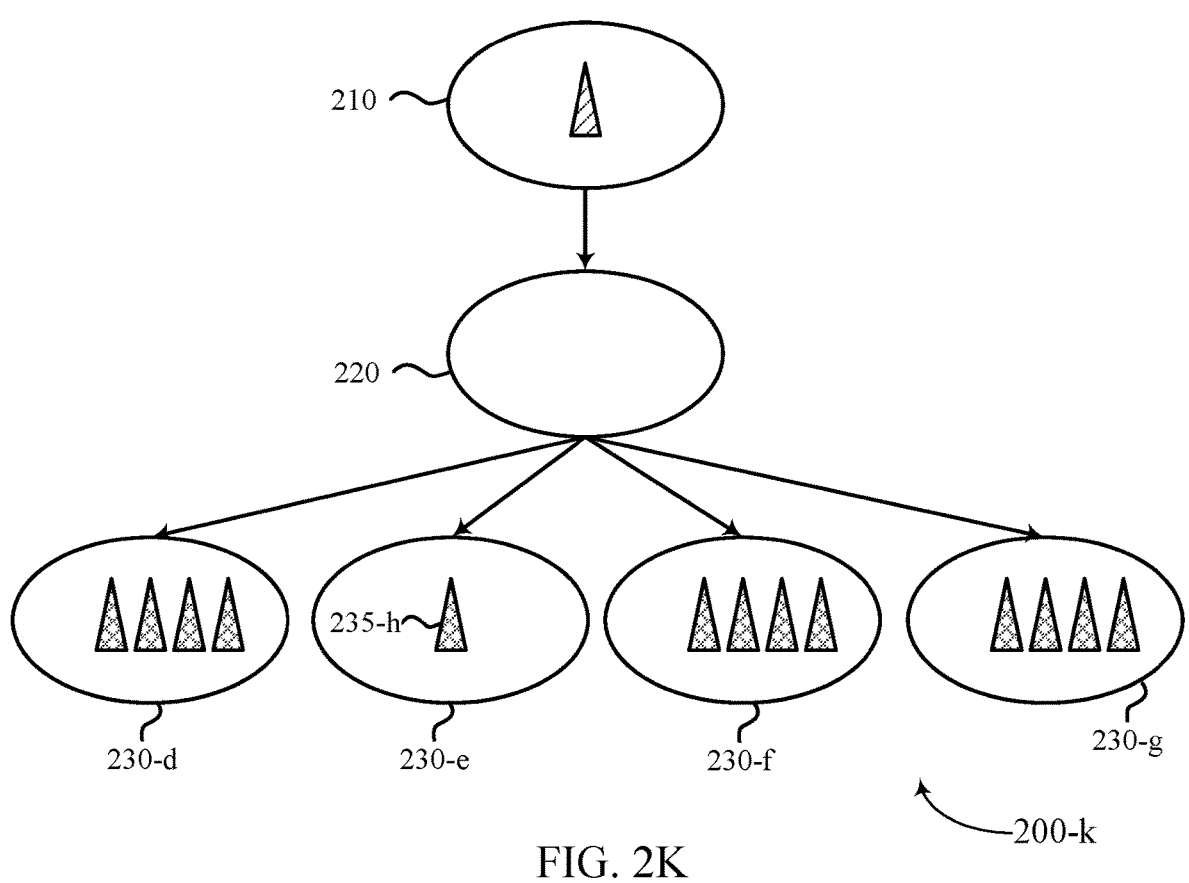

FIG. 2K illustrates an example of a system 200-*k* after an operation that supports techniques to balance log structured merge trees in accordance with examples as disclosed herein. The operation may include merging key-value block sets 235 of the leaf node 230-*e*. For example, as part of a garbage collection operation, the system 200-*k* may delete or remove one or more keys and corresponding values from the key-value block sets 235 of the leaf node 230-*e*. In some cases, the removed keys and values may be indicated in the indication 260. For example, the indication 260 may remain in the leaf node 230-*e* until a garbage collection operation, and the indication 260 may enable the system 200-*k* to remove the indicated keys and values from the key-value block sets 235 of the leaf node 230-*e*. In some cases, upon removing the indicated keys and values, the system 200-*k* may merge the remaining key blocks 245 and value blocks 250 into a single key-value block set 235-*h*. In some examples, due to merging of key-value block sets 235 to the leaf node 230-*e*, a sum of sizes of the leaf node 230-*e* and one or more adjacent leaf nodes 230 (e.g., the leaf node 230-*d* or the leaf node 230-*f*) may drop below a threshold. Accordingly, the system 200-*k* may determine to join the leaf node 230-*e* with the adjacent leaf node 230-*d*.

Figure 2L:
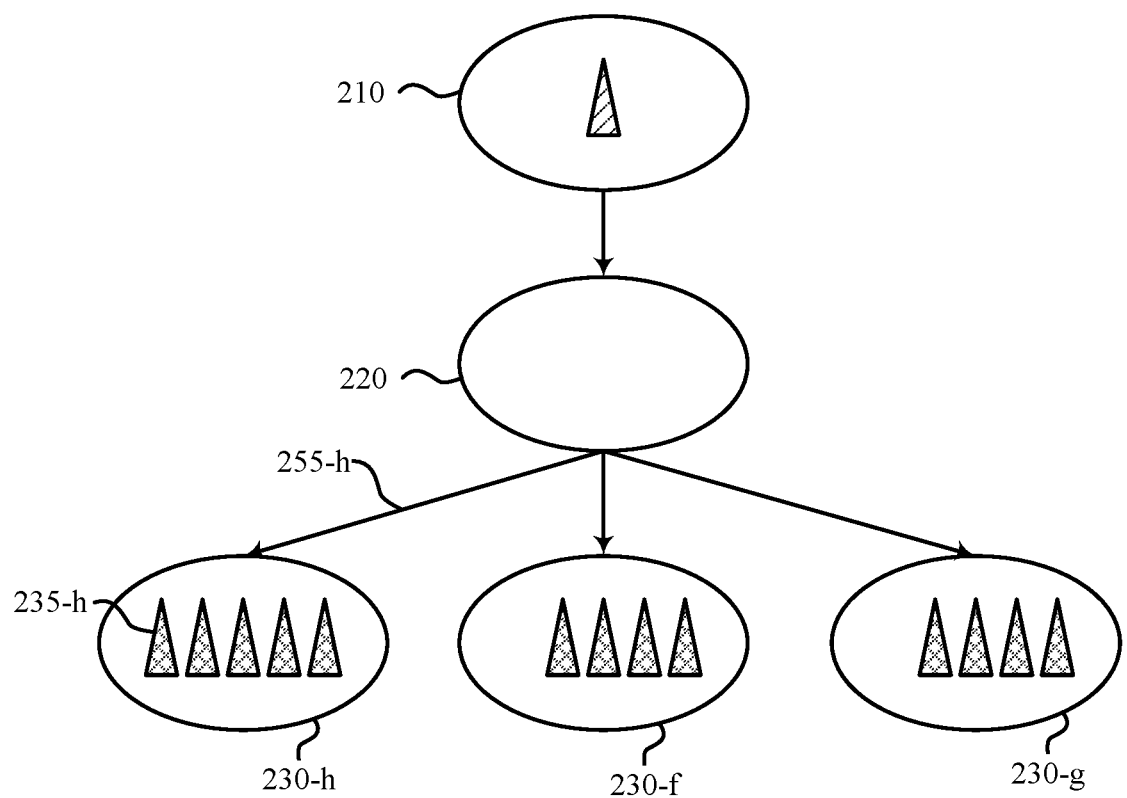

FIG. 2L illustrates an example of a system 200-1 after an operation that supports techniques to balance log structured merge trees in accordance with examples as disclosed herein. The operation may include joining the leaf node 230-*e* with an adjacent leaf node 230, such as the leaf node 230-*d*, into the leaf node 230-*h*. In some cases, an adjacent leaf node 230 of the leaf node 230-*e* may be a leaf node 230 which immediately precedes or proceeds the leaf node 230-*e* in accordance with the ordering of the set of leaf nodes 230. In some examples, to join the leaf nodes 230-*d* and 230-*e*, the system 200-1 may generate the leaf node 230-*h* and place each key-value block set 235 of the leaf node 230-*d* and each key-value block set of the leaf node 230-*e* (e.g., the key-value block set 235-*h*) in the leaf node 230-*h*. In some examples, the system 200-1 may set a key of an edge 255-*h* between the leaf node 230-*h* and the root node 220 to a value corresponding to the greater of the keys of the edges of the leaf node 230-*d* and the leaf node 230-*e*.

In some examples, joining the leaf node 230-*d* and the leaf node 230-*e* may maintain a physical location of the key-value block sets 235 of the leaf nodes 230. For example, transferring media blocks from the leaf node 230-*d* and the leaf node 230-*e* to the leaf node 230-*h* may be performed by modifying metadata associated with the media blocks, such as by modifying a virtual address for the media blocks or modifying metadata associated with the data structure. Accordingly, the media blocks may remain at a same physical address (e.g., a same set of memory cells, a same physical location on the non-volatile memory device) before and after the joining.

Figure 3:
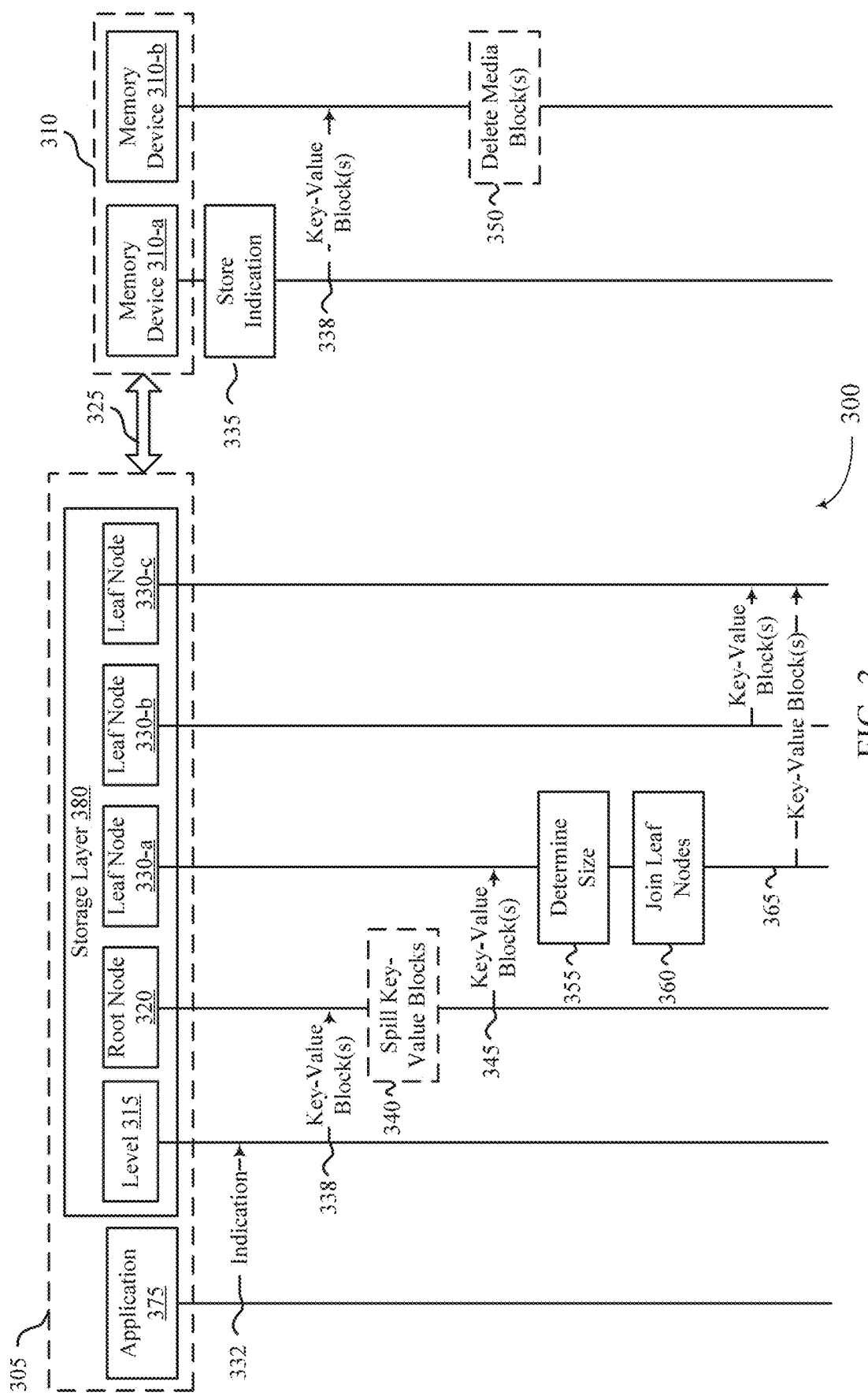
FIG. 3 illustrates an example of a process flow that supports techniques to balance log structured merge trees in accordance with examples as disclosed herein.

FIG. 3 illustrates an example of a process flow 300 that supports techniques to balance log structured merge trees in accordance with examples as disclosed herein. Operations of the process flow 300 may be performed by a host device 305 and one or more memory devices 310, which may be examples of the respective devices described with reference to FIGS. 1 and 2. Aspects of the process flow 300 may be implemented by one or more controllers (e.g., one or more respective controllers at a host device 305 or a memory device 310), among other components. Additionally, or alternatively, aspects of the process flow 300 may be implemented as instructions stored in memory (e.g., respective firmware stored in a memory of or coupled with a host device 305 or a memory device 310). For example, the instructions, when executed by a controller, may cause a controller to perform one or more operations of the process flow 300.

The host device 305 may implement aspects of the systems 200-*a* through 200-1 to access data of a database stored in the memory devices 310. For example, an application 375 running on the host device 305 may access media blocks stored in key-value block sets and organized in accordance with an LSM tree data structure. In some cases, a storage layer 380 of the host device 305 may maintain the data structure across a first memory device 310-*a* and a second memory device 310-*b*. For example, the storage layer 380 may maintain a first layer having a root node 320 and a second level having one or more leaf nodes, such as the leaf node 330-*a*, the leaf node 330-*b*, and the leaf node 330-*c*. In some examples, the root node 320 and the leaf nodes 330 may be examples of the corresponding structures described with reference to FIGS. 2A through 2L, and data of the root node 320 and the leaf nodes 330 may be stored in a non-volatile or persistent memory device, such as the memory device 310-*b*. The storage layer 380 may further maintain a level 315, which may be an example of the level 205 as described with reference to FIGS. 2A through 2L, and may be stored in a volatile memory device, such as the memory device 310-*a*. In some cases, storage layer 380 may communicate with the memory device 310-*a* and the memory device 310-*b* using an interface 325, which may be controlled by an operating system of the host device 305.

The application 375 may operate the data base using one or more keys corresponding to one or more values, the keys and values being stored in media blocks of the database. In some cases, the application 375 may determine to delete or remove one or more keys and corresponding values from the database. For example, at 332, the application 375 may issue an indication to remove the one or more keys from the database to the storage layer 380. Accordingly, the storage layer 380 may, via an operating system of the host device 305, transmit the indication to the memory device 310-*a*, and the memory device 310-*a* may, at 335, store the indication.

The storage layer 380 may receive the indication, and may store the indication in an active key-value block set of the node level 315. In some cases, the storage layer 380 may continue to receive data from the application 375, such as media blocks or additional indications to delete keys and values, and may add the received data to the active key-value block set. Upon the key-value block set meeting a condition, such as reaching a threshold size, the storage layer 380, at 338, "freeze" or cause the key-value block set to become inactive, and may transfer the key-value block set, including the indication to delete the one or more keys and values, to the root node 320. In some cases, as part of transferring the key-value block set, the storage layer 380 may instruct, via the interface 325, the memory device 310-*a* to transfer the key-value block set to the memory device 310-*b*.

The root node 320 may receive and store the key-value block set and store the key-value block set. In some cases, the root node 320 may continue to receive key-value block sets from the level 315, and may add the received key-value block sets to the root node 320. Upon the root node 320 meeting a condition, such as reaching a threshold size, the storage layer 380 may, at 340, merge the key-value block sets, including the indication to delete one or more keys and one or more values, into a single larger key-value block set and, at 345, transfer the key-value block set to the leaf node 330-*a*, for example as part of a spill operation as described with reference to FIGS. 2C through 2D.

In some cases, at 350, the memory device 310-*b* may perform a memory management operation, such as a garbage collection operation. As part of the garbage collection operation, the memory device 310-*b* may delete the one or more keys and values included in the indication, as described in greater detail with reference to FIG. 2K.

Due to the deletion of media blocks of the leaf node 330-*a*, the size of the leaf node 330-*a* may be significantly less than a size of an adjacent leaf node, such as the leaf node 330-*b*. Accordingly, to maintain balance of the data structure, the storage layer 380 may join the leaf node 330-*a* with an adjacent leaf node. For example, at 355, the storage layer 380 may determine whether a sum of the size of the leaf node 330-*a* and the size of the adjacent leaf node 330-*b* satisfies a threshold. If the sum satisfies the threshold, the storage layer 380 may, at 360, join the leaf node 330-*a* with the leaf node 330-*b*, as described in greater detail with reference to FIG. 2L. In some cases, as part of joining the leaf node 330-*a* with the leaf node 330-*b*, the storage layer 380 may generate a new leaf node 330-*c*, and may, at 365, transfer the key-value block sets of the leaf node 330-*a* and the leaf node 330-*b* to the leaf node 330-*c*. In some cases, upon transferring the key-value block sets, the memory device 310-*b* may remove or delete the leaf node 330-*a* and the leaf node 330-*b*.

Figure 4:
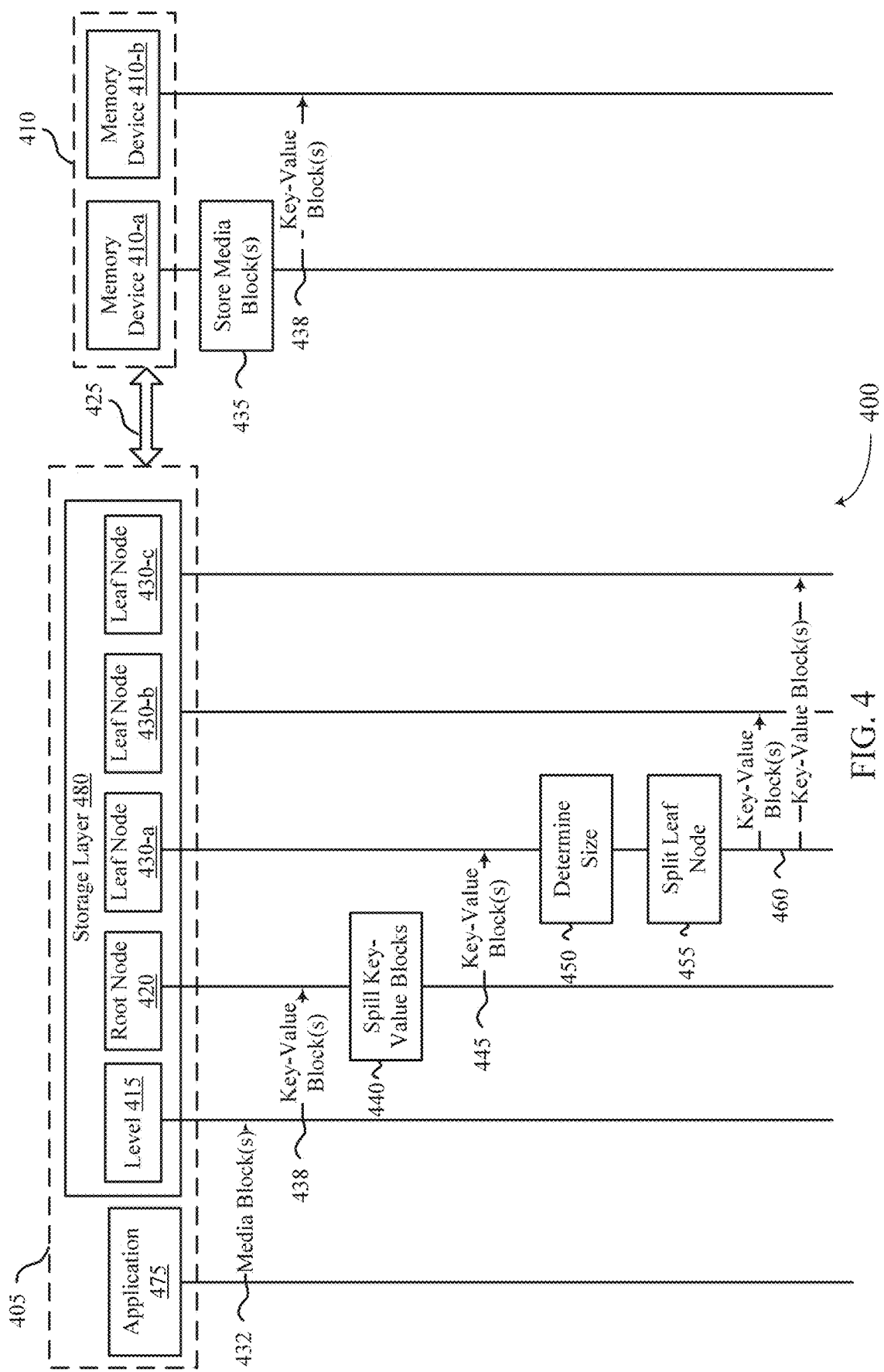
FIG. 4 illustrates an example of a process flow that supports techniques to balance log structured merge trees in accordance with examples as disclosed herein.

FIG. 4 illustrates an example of a process flow 400 that supports techniques to balance log structured merge trees in accordance with examples as disclosed herein. Operations of the process flow 400 may be performed by a host device 405 and one or more memory devices 410, which may be examples of the respective devices described with reference to FIGS. 1 and 2. Aspects of the process flow 400 may be implemented by one or more controllers (e.g., one or more respective controllers at a host device 405 or a memory device 410), among other components. Additionally, or alternatively, aspects of the process flow 400 may be implemented as instructions stored in memory (e.g., respective firmware stored in a memory of or coupled with a host device 405 or a memory device 410). For example, the instructions, when executed by a controller, may cause a controller to perform one or more operations of the process flow 400.

The host device 405 may implement aspects of the systems 200-a through 200-1 to access data of a database stored in the memory devices 410. For example, an application 475 running on the host device 405 may access media blocks stored in key-value block sets and organized in accordance with an LSM tree data structure. In some cases, a storage layer 480 of the host device 405 may maintain the data structure across a first memory device 410-a and a second memory device 410-b. For example, the storage layer 480 may maintain a first layer having a root node 420 and a second level having one or more leaf nodes, such as the leaf node 430-a, the leaf node 430-b, and the leaf node 430-c. In some examples, the root node 420 and the leaf nodes 430 may be examples of the corresponding structures described with reference to FIGS. 2A through 2L, and data of the root node 420 and the leaf nodes 430 may be stored in a non-volatile or persistent memory device, such as the memory device 410-b. The storage layer 480 may further maintain a level 415, which may be an example of the level 205 as described with reference to FIGS. 2A through 2L, and may be stored in a volatile memory device, such as the memory device 410-a. In some cases, storage layer 480 may communicate with the memory device 410-a and the memory device 410-b using an interface 425, which may be controlled by an operating system of the host device 405.

The application 475 may operate the data base using one or more keys corresponding to one or more values, the keys and values being stored in media blocks of the database. In some cases, the application 475 may store one or more keys and corresponding values in the database. For example, at 432, the application 475 may issue one or more media blocks containing keys and values to the storage layer 480. Accordingly, the storage layer 480 may, via the interface 425, transmit the one or more media blocks to the memory device 410-a, and the memory device 410-a may, at 435, store the one or more media blocks.

The level 415 may receive and store the one or more media blocks in an active key-value block set. In some cases, the storage layer 480 may continue to receive data from the application 475, such as additional media blocks, and may add the received data to the active key-value block set. Upon the key-value block set meeting a condition, such as reaching a threshold size, the storage layer 480 may, at 438, "freeze" or cause the key-value block set to become inactive, and may transfer the key-value block set to the root node 420 in the memory device 410-b. In some cases, as part of transferring the key-value block set, the storage layer 480 may instruct, via the interface 425, the memory device 410-a to transfer the key-value block set to the memory device 410-b.

The root node 420 may receive and store the key-value block set. In some cases, the root node 420 may continue to receive key-value block sets from the level 415, and the storage layer 480 may add the received key-value block sets to the root node 420. Upon the root node 420 meeting a condition, such as reaching a threshold size, the storage layer 480 may, at 440, merge the key-value block sets into a single larger key-value block set and, at 445, transfer the key-value block set to the leaf node 430-a, for example as part of a spill operation as described with reference to FIGS. 2C through 2D.

Due to the addition of key-value block sets to the leaf node 430-a, the size of the leaf node 430-a may exceed a size threshold. Accordingly, to maintain balance of the data structure, the storage layer 480 may split the leaf node 430-a into the leaf node 430-b and the leaf node 430-c. For example, at 450, the storage layer 480 may determine whether the size of the leaf node 430-a satisfies a threshold. If the size satisfies the threshold, the storage layer 480 may, at 455, split the leaf node 430-a into the leaf node 430-b and the leaf node 430-c, as described in greater detail with reference to FIG. 2F. In some cases, as part of splitting the leaf node 430-a, the storage layer 480 may generate the new leaf node 430-b and the new leaf node 430-c, and may, at 460, transfer a first subset of the key-value block sets of the leaf node 430-a to the leaf node 430-b and transfer a second subset of the key-value block sets of the leaf node 430-a to the leaf node 430-c. In some cases, upon transferring the key-value block sets, the storage layer 480 may remove or delete the leaf node 430-a. In some examples, splitting the leaf node 430-a may include rewriting a split key block and a split value block of the key-value block sets of the leaf node 430-a. In such cases, the storage layer 380 may write, via the interface 425, the split key block and the split value block of the key-value block sets of the leaf node 430-a to the memory device 410-b.

Figure 5:
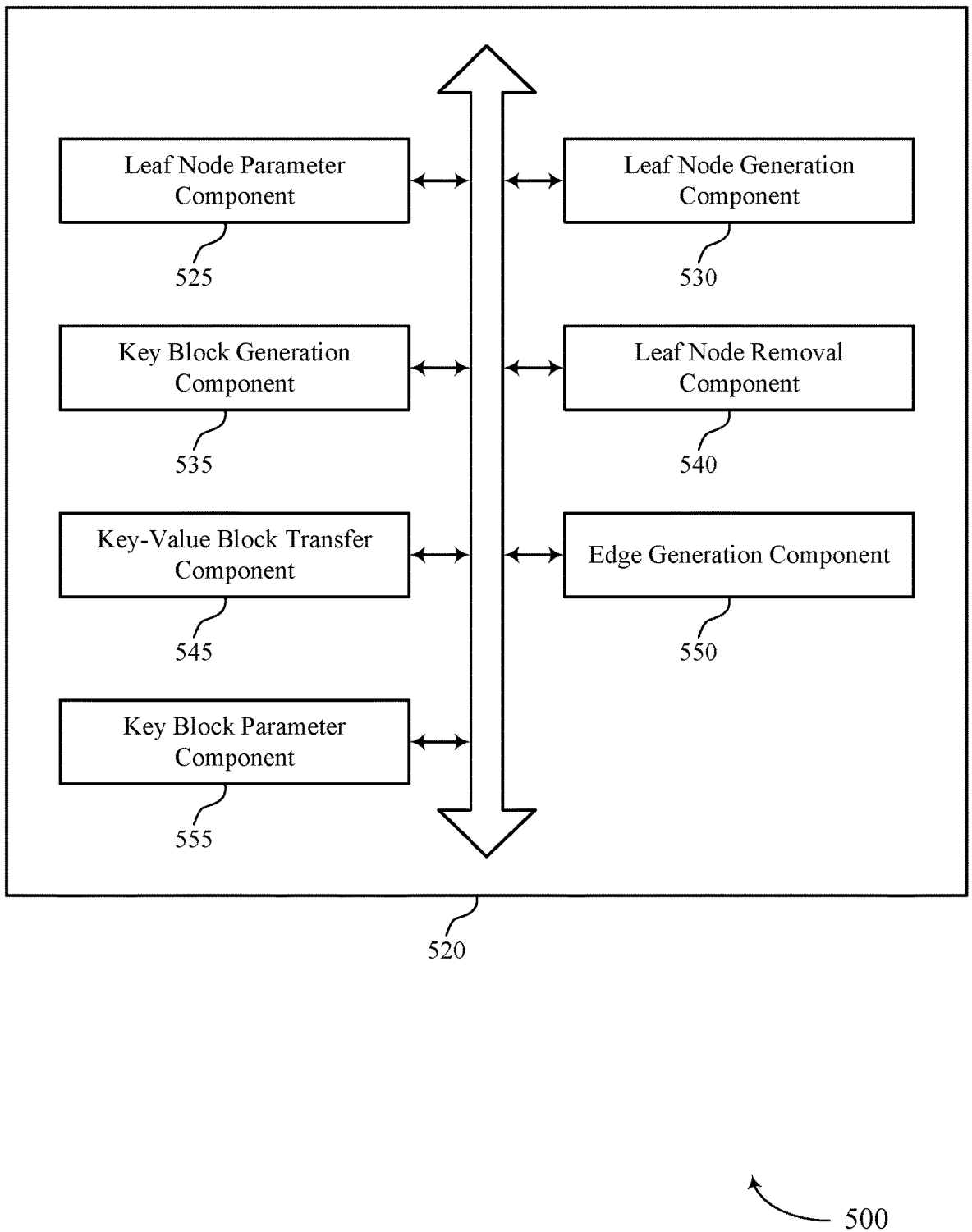
FIG. 5 shows a block diagram of a storage layer that supports techniques to balance log structured merge trees in accordance with examples as disclosed herein.

FIG. 5 shows a block diagram 500 of a storage layer 520 that supports techniques to balance log structured merge trees in accordance with examples as disclosed herein. The storage layer 520 may be an example of aspects of a storage layer as described with reference to FIGS. 1 through 4. The storage layer 520, or various components thereof, may be an example of means for performing various aspects of techniques to balance log structured merge trees as described herein. For example, the storage layer 520 may include a leaf node parameter component 525, a leaf node generation component 530, a key block generation component 535, a leaf node removal component 540, a key-value block set transfer component 545, an edge generation component 550, a key block parameter component 555, or any combination thereof. Each of these components may communicate, directly or indirectly, with one another (e.g., via one or more buses).

The leaf node parameter component 525 may be configured as or otherwise support a means for determining whether a size of a first leaf node of an ordered set of leaf nodes of a data structure satisfies a threshold, the data structure including: a first level having a root node including a set of key blocks, each key block of the root node comprising a respective plurality of keys; a second level having the set of leaf nodes each including a respective set of key blocks, each key block of the set of leaf nodes including a plurality of keys; and a set of edges, each edge between the root node and a respective leaf node. The leaf node generation component 530 may be configured as or otherwise support a means for generating a second leaf node and a third leaf node based on determining that the size of the first leaf node satisfies the threshold, where the second leaf node includes a first subset of the set of key blocks of the first leaf node and the third leaf node includes a second subset of the set of key blocks of the first leaf node.

In some examples, to support generating the second leaf node and the third leaf node, the leaf node parameter component 525 may be configured as or otherwise support a means for identifying a key of a first key block of the set of key blocks of the first leaf node. In some examples, to support generating the second leaf node and the third leaf node, the key block generation component 535 may be configured as or otherwise support a means for generating a second key block having a first subset of the plurality of keys of the first key block, each key of first subset being less than or equal to the identified key, and a third key block having a second subset of the plurality of keys of the first key block, each key of the second subset being greater than the identified key. In some examples, to support generating the second leaf node and the third leaf node, the key block generation component 535 may be configured as or otherwise support a means for adding the second key block to the second leaf node and the third key block to the third leaf node.

In some examples, each key of each key block of the second leaf node is less than or equal to the identified key and each key of each block of the third leaf node is greater than the identified key.

In some examples, the edge generation component 550 may be configured as or otherwise support a means for generating a first edge for the second leaf node, the first edge having a key corresponding to the identified key, and a second edge for the third leaf node, the second edge having a key corresponding to a key of an edge for the first leaf node.

In some examples, to support generating the second leaf node and the third leaf node, the leaf node removal component 540 may be configured as or otherwise support a means for removing the first leaf node and an edge for the first leaf node from the data structure.

In some examples, the root node and each leaf node of the set of leaf nodes include a respective set of value blocks, each value block including a plurality of values corresponding to a plurality of keys of the respective set of key blocks of the root node and the set of leaf nodes.

In some examples, the root node and each leaf node of the set of leaf nodes further include a respective set of key-value block sets, each key-value block set including a respective subset of the set of key blocks and a respective subset of value blocks of the root node and the set of leaf nodes.

In some examples, to support generating the second leaf node and the third leaf node, the key block parameter component 555 may be configured as or otherwise support a means for identifying a key of a key block of the set of key blocks of the first leaf node. In some examples, to support generating the second leaf node and the third leaf node, the key block generation component 535 may be configured as or otherwise support a means for writing, for each key-value block set of the first leaf node, respective first portions of respective first key blocks including the key to respective second key blocks in the second leaf node and respective second portions of the respective first key blocks to respective third key blocks in the third leaf node, where a physical location of a remainder of the first subset of the set of key blocks and second subset of the set of key blocks of the first leaf node are maintained.

In some examples, the size of the first leaf node corresponds to a sum of respective sizes of each key-value block set of the first leaf node.

In some examples, the respective set of key-value block sets of the root node and the set of leaf nodes is ordered based on an age of the key-value block sets of the set of the respective key-value block sets.

In some examples, the respective set of key blocks of each key-value block set of the root node and the set of leaf nodes is ordered based on the respective plurality of keys of the respective set of key blocks.

In some examples, each edge is associated with a respective key of a set of keys. In some examples, the set of leaf nodes is ordered based on the set of keys.

In some examples, the key-value block set transfer component 545 may be configured as or otherwise support a means for transferring one or more first key-value block sets from a third level of the data structure to the root node. In some examples, the key-value block set transfer component 545 may be configured as or otherwise support a means for transferring a second key-value block set including at least a subset of the one or more first key-value block sets from the root node to the first leaf node based on a key of an edge for the first leaf node, where determining whether the size of the first leaf node satisfies the threshold is based on transferring the second key-value block set.

In some examples, the first level of the data structure and the second level of the data structure are stored on a non-volatile memory device, and the third level of the data structure is written to a volatile memory device.

In some examples, the data structure includes a log-structured merge (LSM) tree.

In some examples, the leaf node parameter component 525 may be configured as or otherwise support a means for determining whether a size of a first leaf node and a size of a second leaf node of an ordered set of leaf nodes of a data structure satisfies a threshold, the first leaf node adjacent to the second leaf node, where the data structure includes: a first level having a root node including a set of key blocks, each key block of the root node comprising a respective plurality of keys; a second level having the set of leaf nodes each including a respective set of key blocks, each key block of the set of leaf nodes including a plurality of keys; and a set of edges, each edge between the root node and a respective leaf node. In some examples, the leaf node generation component 530 may be configured as or otherwise support a means for generating a third leaf node based on determining that the size of the first leaf node and the second leaf node satisfies the threshold, where the third leaf node includes a set of key blocks of the first leaf node and a set of key blocks of the second leaf node.

In some examples, to support generating the third leaf node, the edge generation component 550 may be configured as or otherwise support a means for generating a first edge for the third leaf node, the first edge associated with a key corresponding to a key of a second edge for the second leaf node, where the key of the second edge of the second leaf node is greater than a key of a third edge of the first leaf node.

In some examples, the root node and each leaf node of the set of leaf nodes include a respective set of value blocks, each value block including a plurality of values corresponding to a plurality of keys of the respective set of key blocks of the root node and the set of leaf nodes.

In some examples, the root node and each leaf node of the set of leaf nodes further include a respective set of key-value block sets, each key-value block set including a respective subset of the set of key blocks and a respective subset of value blocks of the root node and the set of leaf nodes.

In some examples, the respective set of key-value block sets of the root node and the set of leaf nodes is ordered based on an age of the respective key-value block set.

In some examples, the respective set of key blocks of each key-value block set of the root node and the set of leaf nodes is ordered based on the respective plurality of keys of the respective set of key blocks.

In some examples, each edge is associated with a respective key of a set of keys. In some examples, the set of leaf nodes is ordered based on the set of keys.

In some examples, the key-value block set transfer component 545 may be configured as or otherwise support a means for transferring an indication to remove one or more keys from the root node to the first leaf node of based on a key of an edge for the first leaf node. In some examples, the leaf node parameter component 525 may be configured as or otherwise support a means for reducing the size of the first leaf node based on the indication, where determining whether the size of the first leaf node and the size of the second leaf node satisfies the threshold is based on transferring the indication.

In some examples, the first level of the data structure and the second level of the data structure are stored on a non-volatile memory device, and a third level of the data structure is written to a volatile memory device.

Figure 6:
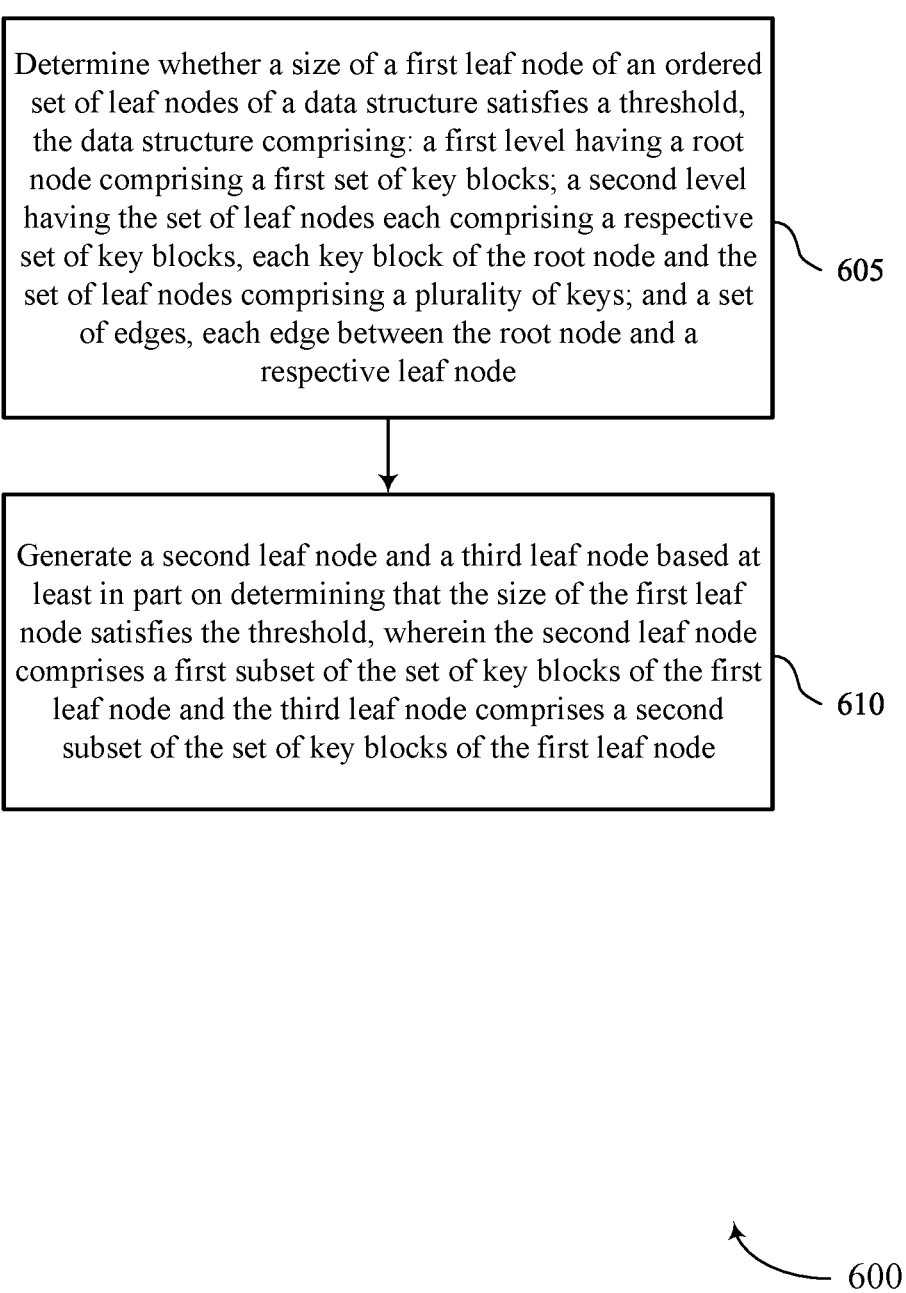

FIG. 6 shows a flowchart illustrating a method 600 that supports techniques to balance log structured merge trees in accordance with examples as disclosed herein. The operations of method 600 may be implemented by a storage layer or its components as described herein. For example, the operations of method 600 may be performed by a storage layer as described with reference to FIGS. 1 through 5. For example, the operations of method 600 may be directed toward splitting a leaf node, as described with reference to FIGS. 2E, 2F, and 3. In some examples, a storage layer may execute a set of instructions to control the functional elements of the device to perform the described functions. Additionally, or alternatively, the storage layer may perform aspects of the described functions using special-purpose hardware.

At 605, the method may include determining whether a size of a first leaf node of an ordered set of leaf nodes of a data structure satisfies a threshold, the data structure including: a first level having a root node including a set of key blocks, each key block of the root node comprising a respective plurality of keys; a second level having the set of leaf nodes each including a respective set of key blocks, each key block of the set of leaf nodes including a plurality of keys; and a set of edges, each edge between the root node and a respective leaf node. The operations of 605 may be performed in accordance with examples as disclosed herein. In some examples, aspects of the operations of 605 may be performed by a leaf node parameter component 525 as described with reference to FIG. 5.

At 610, the method may include generating a second leaf node and a third leaf node based on determining that the size of the first leaf node satisfies the threshold, where the second leaf node includes a first subset of the set of key blocks of the first leaf node and the third leaf node includes a second subset of the set of key blocks of the first leaf node. The operations of 610 may be performed in accordance with examples as disclosed herein. In some examples, aspects of the operations of 610 may be performed by a leaf node generation component 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining whether a size of a first leaf node of an ordered set of leaf nodes of a data structure satisfies a threshold, the data structure including: a first level having a root node including a set of key blocks; a second level having the set of leaf nodes each including a respective set of key blocks, each key block of the root node and the set of leaf nodes including a plurality of keys; and a set of edges, each edge between the root node and a respective leaf node and generating a second leaf node and a third leaf node based on determining that the size of the first leaf node satisfies the threshold, where the second leaf node includes a first subset of the set of key blocks of the first leaf node and the third leaf node includes a second subset of the set of key blocks of the first leaf node.

Aspect 2: The method, apparatus, or non-transitory computer-readable medium of aspect 1, where generating the second leaf node and the third leaf node includes operations, features, circuitry, logic, means, or instructions, or any combination thereof for identifying a key of a first key block of the set of key blocks of the first leaf node; generating a second key block having a first subset of the plurality of keys of the first key block, each key of first subset being less than or equal to the identified key, and a third key block having a second subset of the plurality of keys of the first key block, each key of the second subset being greater than the identified key; and adding the second key block to the second leaf node and the third key block to the third leaf node.

Aspect 3: The method, apparatus, or non-transitory computer-readable medium of aspect 2, where each key of each key block of the second leaf node is less than or equal to the identified key and each key of each block of the third leaf node is greater than the identified key.

Aspect 4: The method, apparatus, or non-transitory computer-readable medium of any of aspects 2 through 3, further including operations, features, circuitry, logic, means, or instructions, or any combination thereof for generating a first edge for the second leaf node, the first edge having a key corresponding to the identified key, and a second edge for the third leaf node, the second edge having a key corresponding to a key of an edge for the first leaf node.

Aspect 5: The method, apparatus, or non-transitory computer-readable medium of any of aspects 1 through 4, where generating the second leaf node and the third leaf node includes operations, features, circuitry, logic, means, or instructions, or any combination thereof for removing the first leaf node and an edge for the first leaf node from the data structure.

Aspect 6: The method, apparatus, or non-transitory computer-readable medium of any of aspects 1 through 5, where the root node and each leaf node of the set of leaf nodes include a respective set of value blocks, each value block including a plurality of values corresponding to a plurality of keys of the respective set of key blocks of the root node and the set of leaf nodes.

Aspect 7: The method, apparatus, or non-transitory computer-readable medium of aspect 6, where the root node and each leaf node of the set of leaf nodes further include a respective set of key-value block sets, each key-value block set including a respective subset of the set of key blocks and a respective subset of value blocks of the root node and the set of leaf nodes.

Aspect 8: The method, apparatus, or non-transitory computer-readable medium of aspect 7, where generating the second leaf node and the third leaf node includes operations, features, circuitry, logic, means, or instructions, or any combination thereof for identifying a key of a key block of the set of key blocks of the first leaf node and writing, for each key-value block set of the first leaf node, respective first portions of respective first key blocks including the key to respective second key blocks in the second leaf node and respective second portions of the respective first key blocks to respective third key blocks in the third leaf node, where a physical location of a remainder of the first subset of the set of key blocks and second subset of the set of key blocks of the first leaf node are maintained.

Aspect 9: The method, apparatus, or non-transitory computer-readable medium of any of aspects 7 through 8, where the size of the first leaf node corresponds to a sum of respective sizes of each key-value block set of the first leaf node.

Aspect 10: The method, apparatus, or non-transitory computer-readable medium of any of aspects 7 through 9, where the respective set of key-value block sets of the root node and the set of leaf nodes is ordered based on an age of the key-value block sets of the set of the respective key-value block sets.

Aspect 11: The method, apparatus, or non-transitory computer-readable medium of any of aspects 7 through 10, where the respective set of key blocks of each key-value block set of the root node and the set of leaf nodes is ordered based on the respective plurality of keys of the respective set of key blocks.

Aspect 12: The method, apparatus, or non-transitory computer-readable medium of any of aspects 1 through 11, where each edge is associated with a respective key of a set of keys and the set of leaf nodes is ordered based on the set of keys.

Aspect 13: The method, apparatus, or non-transitory computer-readable medium of any of aspects 1 through 12, further including operations, features, circuitry, logic, means, or instructions, or any combination thereof for transferring one or more first key-value block sets from a third level of the data structure to the root node and transferring a second key-value block set including at least a subset of the one or more first key-value block sets from the root node to the first leaf node based on a key of an edge for the first leaf node, where determining whether the size of the first leaf node satisfies the threshold is based on transferring the second key-value block set.

Aspect 14: The method, apparatus, or non-transitory computer-readable medium of aspect 13, where the first level of the data structure and the second level of the data structure are stored on a non-volatile memory device, and the third level of the data structure is written to a volatile memory device.

Aspect 15: The method, apparatus, or non-transitory computer-readable medium of any of aspects 1 through 14, where the data structure includes a log-structured merge (LSM) tree.

FIG. 7 shows a flowchart illustrating a method 700 that supports techniques to balance log structured merge trees in accordance with examples as disclosed herein. The operations of method 700 may be implemented by a storage layer or its components as described herein. For example, the operations of method 700 may be performed by a storage layer as described with reference to FIGS. 1 through 5. For example, the operations of method 700 may be directed toward joining a leaf node with an adjacent leaf node, as described with reference to FIGS. 2K, 2L, and 4. In some examples, a storage layer may execute a set of instructions to control the functional elements of the device to perform the described functions. Additionally, or alternatively, the storage layer may perform aspects of the described functions using special-purpose hardware.

At 705, the method may include determining whether a size of a first leaf node and a size of a second leaf node of an ordered set of leaf nodes of a data structure satisfies a threshold, the first leaf node adjacent to the second leaf node, where the data structure includes: a first level having a root node including a set of key blocks, each key block of the root node comprising a respective plurality of keys; a second level having the set of leaf nodes each including a respective set of key blocks, each key block and the set of leaf nodes including a plurality of keys; and a set of edges, each edge between the root node and a respective leaf node. The operations of 705 may be performed in accordance with examples as disclosed herein. In some examples, aspects of the operations of 705 may be performed by a leaf node parameter component 525 as described with reference to FIG. 5.

At 710, the method may include generating a third leaf node based on determining that the size of the first leaf node and the second leaf node satisfies the threshold, where the third leaf node includes a set of key blocks of the first leaf node and a set of key blocks of the second leaf node. The operations of 710 may be performed in accordance with examples as disclosed herein. In some examples, aspects of the operations of 710 may be performed by a leaf node generation component 530 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 16: A method, apparatus, or non-transitory computer-readable medium including operations, features, circuitry, logic, means, or instructions, or any combination thereof for determining whether a size of a first leaf node and a size of a second leaf node of an ordered set of leaf nodes of a data structure satisfies a threshold, the first leaf node adjacent to the second leaf node, where the data structure includes: a first level having a root node including a set of key blocks; a second level having the set of leaf nodes each including a respective set of key blocks, each key block of the root node and the set of leaf nodes including a plurality of keys; and a set of edges, each edge between the root node and a respective leaf node and generating a third leaf node based on determining that the size of the first leaf node and the second leaf node satisfies the threshold, where the third leaf node includes a set of key blocks of the first leaf node and a set of key blocks of the second leaf node.

Aspect 17: The method, apparatus, or non-transitory computer-readable medium of aspect 16, where generating the third leaf node includes operations, features, circuitry, logic, means, or instructions, or any combination thereof for generating a first edge for the third leaf node, the first edge associated with a key corresponding to a key of a second edge for the second leaf node, where the key of the second edge of the second leaf node is greater than a key of a third edge of the first leaf node.

Aspect 18: The method, apparatus, or non-transitory computer-readable medium of any of aspects 16 through 17, where the root node and each leaf node of the set of leaf nodes include a respective set of value blocks, each value block including a plurality of values corresponding to a plurality of keys of the respective set of key blocks of the root node and the set of leaf nodes.

Aspect 19: The method, apparatus, or non-transitory computer-readable medium of aspect 18, where the root node and each leaf node of the set of leaf nodes further include a respective set of key-value block sets, each key-value block set including a respective subset of the set of key blocks and a respective subset of value blocks of the root node and the set of leaf nodes.

Aspect 20: The method, apparatus, or non-transitory computer-readable medium of aspect 19, where the respective set of key-value block sets of the root node and the set of leaf nodes is ordered based on an age of the respective key-value block set.

Aspect 21: The method, apparatus, or non-transitory computer-readable medium of any of aspects 19 through 20, where the respective set of key blocks of each key-value block set of the root node and the set of leaf nodes is ordered based on the respective plurality of keys of the respective set of key blocks.

Aspect 22: The method, apparatus, or non-transitory computer-readable medium of any of aspects 16 through 21, where each edge is associated with a respective key of a set of keys and the set of leaf nodes is ordered based on the set of keys.

Aspect 23: The method, apparatus, or non-transitory computer-readable medium of any of aspects 16 through 22, further including operations, features, circuitry, logic, means, or instructions, or any combination thereof for transferring an indication to remove one or more keys from the root node to the first leaf node of based on a key of an edge for the first leaf node and reducing the size of the first leaf node based on the indication, where determining whether the size of the first leaf node and the size of the second leaf node satisfies the threshold is based on transferring the indication.

Aspect 24: The method, apparatus, or non-transitory computer-readable medium of aspect 23, where the first level of the data structure and the second level of the data structure are stored on a non-volatile memory device, and a third level of the data structure is written to a volatile memory device.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   determining whether a size of a first leaf node of an ordered set of leaf nodes of a data structure satisfies a threshold, the data structure comprising:
      a first level having a root node comprising a set of key blocks, each key block of the root node comprising a respective plurality of keys;
      a second level having the set of leaf nodes each comprising a respective set of key blocks, each key block of the set of leaf nodes comprising a respective plurality of keys; and
      a set of edges, each edge between the root node and a respective leaf node; and
   generating a second leaf node and a third leaf node based on determining that the size of the first leaf node satisfies the threshold, the generating comprising adding a first subset of the set of key blocks of the first leaf node to the second leaf node and adding a second subset of the set of key blocks of the first leaf node to the third leaf node.

2. The method of claim 1, wherein generating the second leaf node and the third leaf node comprises:
   identifying a key of a first key block of the set of key blocks of the first leaf node;
   generating a second key block having a first subset of the plurality of keys of the first key block, each key of the first subset being less than or equal to the identified key, and a third key block having a second subset of the plurality of keys of the first key block, each key of the second subset being greater than the identified key; and
   adding the second key block to the second leaf node and the third key block to the third leaf node.

3. The method of claim 2, wherein each key of each key block of the second leaf node is less than or equal to the identified key and each key of each block of the third leaf node is greater than the identified key.

4. The method of claim 2, further comprising:
   generating a first edge for the second leaf node, the first edge having a key corresponding to the identified key, and a second edge for the third leaf node, the second edge having a key corresponding to a key of an edge for the first leaf node.

5. The method of claim 1, wherein generating the second leaf node and the third leaf node comprises:
   removing the first leaf node and an edge for the first leaf node from the data structure.

6. The method of claim 1, wherein the root node and each leaf node of the set of leaf nodes comprise a respective set of value blocks, each value block comprising a plurality of values corresponding to a plurality of keys of the respective set of key blocks of the root node and the set of leaf nodes.

7. The method of claim 6, wherein the root node and each leaf node of the set of leaf nodes further comprise a respective set of key-value block sets, each key-value block set comprising a respective subset of the set of key blocks and a respective subset of value blocks of the root node and the set of leaf nodes.

8. The method of claim 7, wherein generating the second leaf node and the third leaf node comprises:
   identifying a key of a key block of the set of key blocks of the first leaf node; and
   writing, for each key-value block set of the first leaf node, respective first portions of respective first key blocks comprising the key to respective second key blocks in the second leaf node and respective second portions of the respective first key blocks to respective third key blocks in the third leaf node, wherein a physical location of a remainder of the first subset of the set of key blocks and the second subset of the set of key blocks of the first leaf node are maintained.

9. The method of claim 7, wherein the size of the first leaf node corresponds to a sum of respective sizes of each key-value block set of the first leaf node.

10. The method of claim 7, wherein the respective sets of key-value block sets of the root node and the set of leaf nodes are ordered based on an age of the key-value block sets.

11. The method of claim 7, wherein the respective sets of key blocks of each key-value block set of the root node and the set of leaf nodes are ordered based on the respective plurality of keys.

12. The method of claim 1, wherein each edge is associated with a respective key of a set of keys, and wherein the set of leaf nodes is ordered based on the set of keys.

13. The method of claim 1, further comprising:
transferring one or more first key-value block sets from a third level of the data structure to the root node; and
transferring a second key-value block set comprising at least a subset of the one or more first key-value block sets from the root node to the first leaf node based on a key of an edge for the first leaf node, wherein determining whether the size of the first leaf node satisfies the threshold is based on transferring the second key-value block set.

14. The method of claim 13, wherein the first level of the data structure and the second level of the data structure are stored on a non-volatile memory device, and the third level of the data structure is written to a volatile memory device.

15. The method of claim 1, wherein the data structure comprises a log-structured merge (LSM) tree.

16. A method, comprising:
determining whether a size of a first leaf node and a size of a second leaf node of an ordered set of leaf nodes of a data structure satisfies a threshold, the first leaf node adjacent to the second leaf node, wherein the data structure comprises:
a first level having a root node comprising a set of key blocks, each key block of the root node comprising a respective plurality of keys;
a second level having the set of leaf nodes each comprising a respective set of key blocks, each key block of the set of leaf nodes comprising a respective plurality of keys; and
a set of edges, each edge between the root node and a respective leaf node; and
generating a third leaf node based on determining that the size of the first leaf node and the second leaf node satisfies the threshold, the generating comprising adding a set of key blocks of the first leaf node to the third leaf node and adding a set of key blocks of the second leaf node to the third leaf node.

17. The method of claim 16, wherein generating the third leaf node comprises:
generating a first edge for the third leaf node, the first edge associated with a key corresponding to a key of a second edge for the second leaf node, wherein the key of the second edge of the second leaf node is greater than a key of a third edge of the first leaf node.

18. The method of claim 16, wherein the root node and each leaf node of the set of leaf nodes comprise a respective set of value blocks, each value block comprising a plurality of values corresponding to a plurality of keys of the respective set of key blocks of the root node and the set of leaf nodes.

19. The method of claim 18, wherein the root node and each leaf node of the set of leaf nodes further comprise a respective set of key-value block sets, each key-value block set comprising a respective subset of the set of key blocks and a respective subset of value blocks of the root node and the set of leaf nodes.

20. The method of claim 19, wherein the respective sets of key-value block sets of the root node and the set of leaf nodes are ordered based on an age of the respective key-value block set.

21. The method of claim 19, wherein the respective sets of key blocks of each key-value block set of the root node and the set of leaf nodes are ordered based on the respective plurality of keys.

22. The method of claim 16, wherein each edge is associated with a respective key of a set of keys, and wherein the set of leaf nodes is ordered based on the set of keys.

23. The method of claim 16, further comprising:
transferring an indication to remove one or more keys from the root node to the first leaf node based on a key of an edge for the first leaf node; and
reducing the size of the first leaf node based on the indication, wherein determining whether the size of the first leaf node and the size of the second leaf node satisfies the threshold is based on transferring the indication.

24. The method of claim 23, wherein the first level of the data structure and the second level of the data structure are stored on a non-volatile memory device, and a third level of the data structure is written to a volatile memory device.

25. An apparatus, comprising: a controller associated with a host device, wherein the controller is configured to cause the apparatus to:
determine whether a size of a first leaf node of an ordered set of leaf nodes of a data structure satisfies a threshold, the data structure comprising:
a first level having a root node comprising a set of key blocks, each key block of the root node comprising a respective plurality of keys;
a second level having the set of leaf nodes each comprising a respective set of key blocks, each key block of the set of leaf nodes comprising a respective plurality of keys; and
a set of edges, each edge between the root node and a respective leaf node; and
generate a second leaf node and a third leaf node based on determining that the size of the first leaf node satisfies the threshold, the generating comprising adding a first subset of the set of key blocks of the first leaf node to the second leaf node and adding a second subset of the set of key blocks of the first leaf node to the third leaf node.

26. An apparatus, comprising: a controller associated with a host device, wherein the controller is configured to cause the apparatus to:
determine whether a size of a first leaf node and a size of a second leaf node of an ordered set of leaf nodes of a data structure satisfies a threshold, the first leaf node adjacent to the second leaf node, wherein the data structure comprises:
a first level having a root node comprising a set of key blocks, each key block of the root node comprising a respective plurality of keys;

a second level having the set of leaf nodes each comprising a respective set of key blocks, each key block of the set of leaf nodes comprising a respective plurality of keys; and a set of edges, each edge between the root node and a respective leaf node; and generate a third leaf node based on determining that the size of the first leaf node and the second leaf node satisfies the threshold, the generating comprising adding a set of key blocks of the first leaf node to the third leaf node and adding a set of key blocks of the second leaf node to the third leaf node.

* * * * *